(12) United States Patent
Asami et al.

(10) Patent No.: US 9,113,064 B2
(45) Date of Patent: Aug. 18, 2015

(54) IMAGE PICKUP APPARATUS AND IMAGE ACQUISITION METHOD

(75) Inventors: Kimiharu Asami, Hachioji (JP); Eriko Kagami, Hachioji (JP); Yuji Nakamura, Hachioji (JP); Tsugumoto Kosugiyama, Hachioji (JP); Kazuya Nakabe, Hachioji (JP); Sachiko Tajima, Akishima (JP)

(73) Assignee: Olympus Corporation, Tokyo (JP)

( * ) Notice: Subject to any disclaimer, the term of this patent is extended or adjusted under 35 U.S.C. 154(b) by 473 days.

(21) Appl. No.: 13/023,327

(22) Filed: Feb. 8, 2011

(65) Prior Publication Data

US 2011/0187815 A1 Aug. 4, 2011

(30) Foreign Application Priority Data

Nov. 5, 2009 (JP) .................................. 2009-253800
Dec. 17, 2009 (JP) .................................. 2009-286658

(51) Int. Cl.
*H04N 7/00* (2011.01)
*H04N 7/18* (2006.01)
*H04N 5/228* (2006.01)
*H04N 5/232* (2006.01)

(52) U.S. Cl.
CPC ............... *H04N 5/228* (2013.01); *H04N 5/232* (2013.01); *H04N 7/00* (2013.01); *H04N 7/188* (2013.01)

(58) Field of Classification Search
CPC ............... H04N 5/232; H04N 5/23245; H04N 5/23238; H04N 7/188; G03B 17/18; G02B 2027/187; G06F 1/163
USPC ................................................ 348/82, 208.2
See application file for complete search history.

(56) References Cited

U.S. PATENT DOCUMENTS

| 8,237,787 | B2* | 8/2012 | Hollinger | 348/82 |
| 8,350,892 | B2* | 1/2013 | Hayashi | 348/36 |
| 2003/0133008 | A1* | 7/2003 | Stephenson | 348/47 |
| 2004/0208496 | A1* | 10/2004 | Pilu | 396/263 |
| 2005/0012830 | A1* | 1/2005 | Pilu | 348/231.99 |
| 2005/0248660 | A1* | 11/2005 | Stavely et al. | 348/208.16 |
| 2006/0227384 | A1* | 10/2006 | Kawada | 358/302 |

(Continued)

FOREIGN PATENT DOCUMENTS

| JP | 2003-224761 | 8/2003 |
| JP | 2005-311789 | 11/2005 |

(Continued)

OTHER PUBLICATIONS

Office Action for Japanese Patent Application No. 2009-286658, mailed Sep. 10, 2013 (2 pgs.).

*Primary Examiner* — Joseph Ustaris
*Assistant Examiner* — Rebecca Volentine
(74) *Attorney, Agent, or Firm* — John C. Pokotylo; Straub & Pokotylo

(57) ABSTRACT

An image pickup apparatus includes an image pickup portion and a recording portion that records an image signal based on an output signal from the image pickup portion, for executing a shooting operation with a behavior of a photographer as a trigger, and obtaining a desired static image by performing an automatic manipulation processing of the acquired image; the image pickup apparatus comprising: a posture detection portion that detects a change of posture or moving situation of the image pickup apparatus, and a control portion that controls the execution of shooting operation based on the output signal of the posture detection portion.

9 Claims, 31 Drawing Sheets

(56) References Cited

U.S. PATENT DOCUMENTS

| | | |
|---|---|---|
| 2007/0086764 A1* | 4/2007 | Konicek .................... 396/56 |
| 2008/0253687 A1* | 10/2008 | Zhang et al. ............. 382/284 |
| 2009/0175614 A1* | 7/2009 | Sakurai ..................... 396/301 |
| 2009/0245773 A1* | 10/2009 | Uenaka ..................... 396/55 |
| 2010/0014847 A1* | 1/2010 | Washisu et al. ............ 396/53 |
| 2010/0141735 A1* | 6/2010 | Yamashita et al. ......... 348/36 |
| 2010/0171846 A1* | 7/2010 | Wood et al. ............ 348/231.99 |
| 2010/0177197 A1* | 7/2010 | Kimura et al. ............ 348/208.2 |
| 2010/0188243 A1* | 7/2010 | Tysowski et al. ............ 340/669 |

FOREIGN PATENT DOCUMENTS

| | | |
|---|---|---|
| JP | 2006-060584 | 3/2006 |
| JP | 2007-036492 | 2/2007 |
| JP | 2007-124140 | 5/2007 |
| JP | 2008-067219 | 3/2008 |
| JP | 2009-089220 | 4/2009 |

* cited by examiner

FIG.17
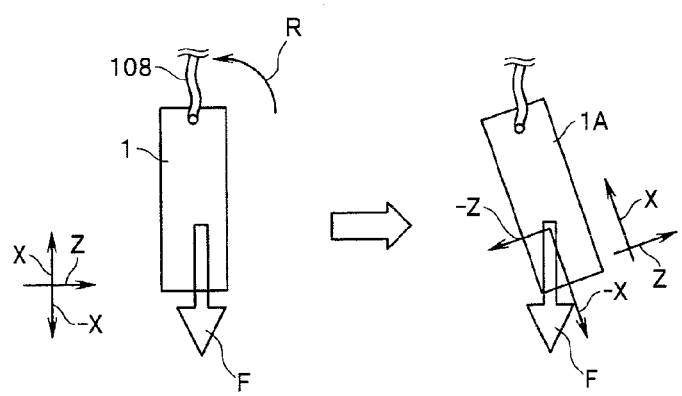
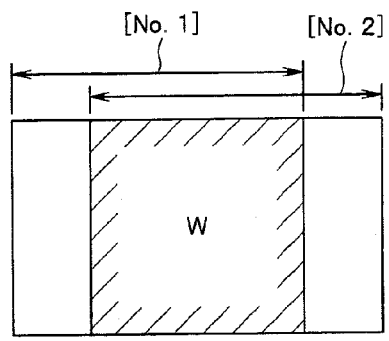
FIG.18A
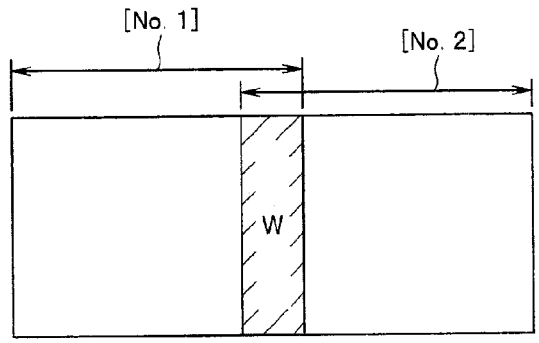
FIG.18B
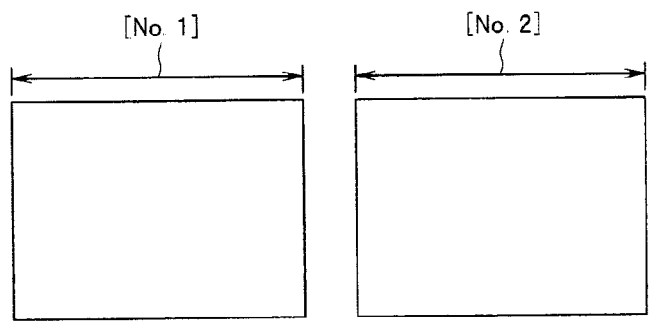
FIG.18C

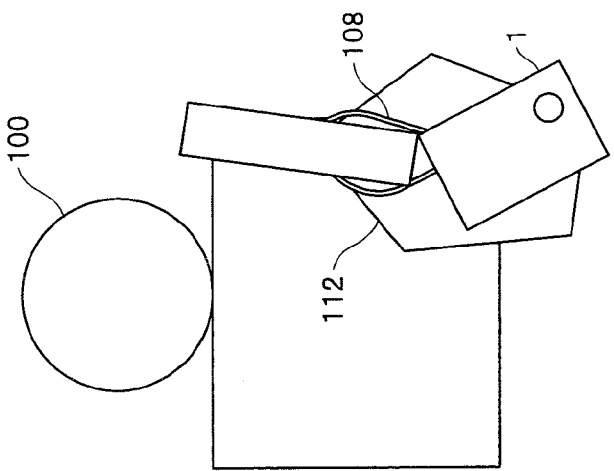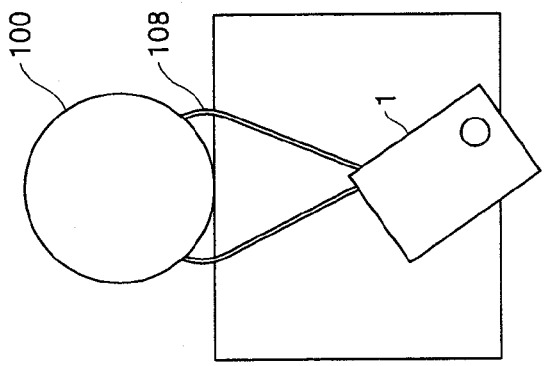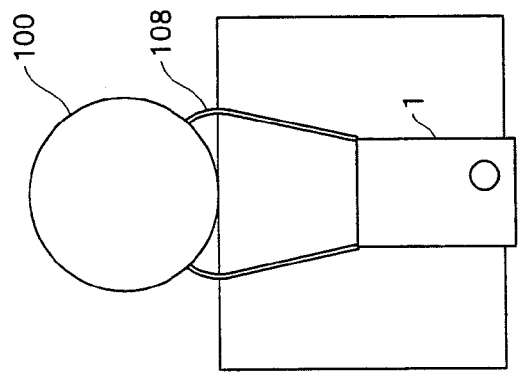

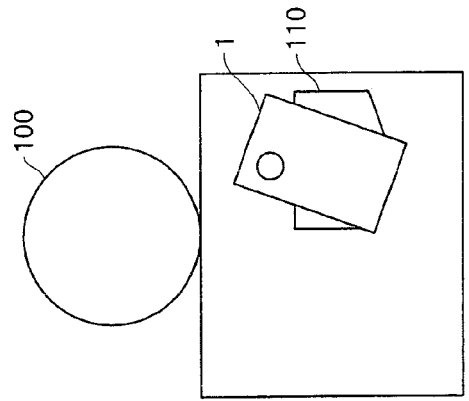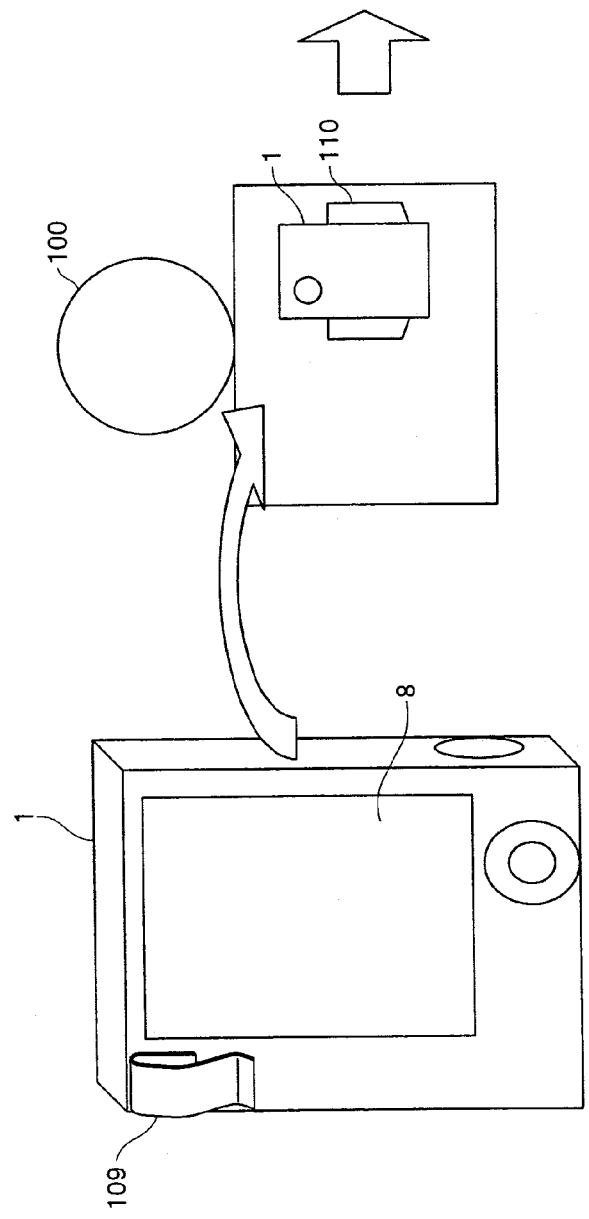

FIG.34A    FIG.34B
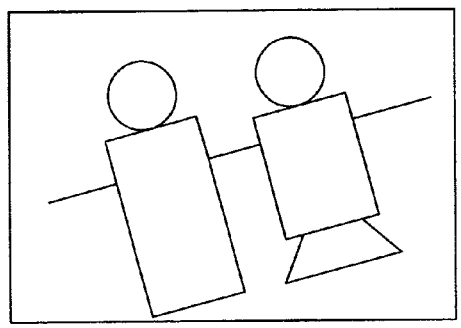 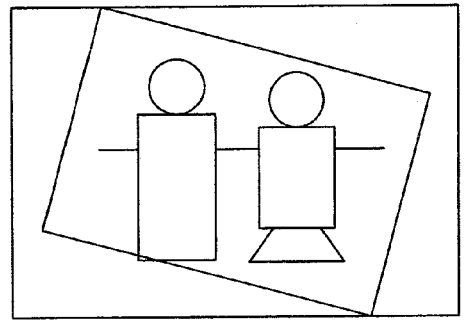
FIG.35A    FIG.35B
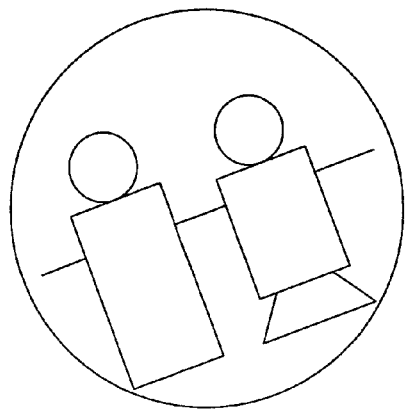 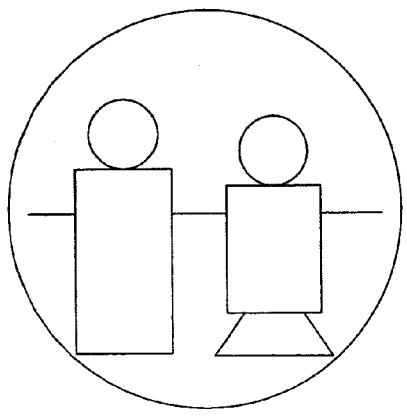

FIG.36A
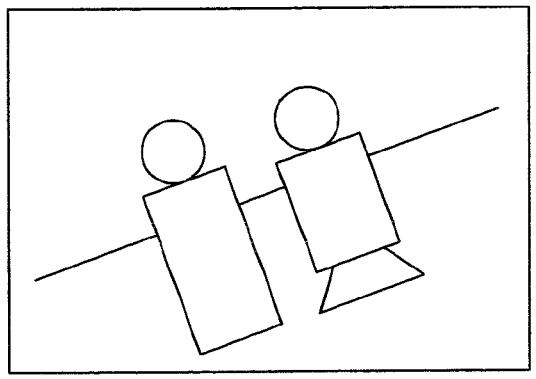
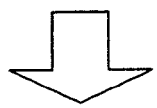
FIG.36B
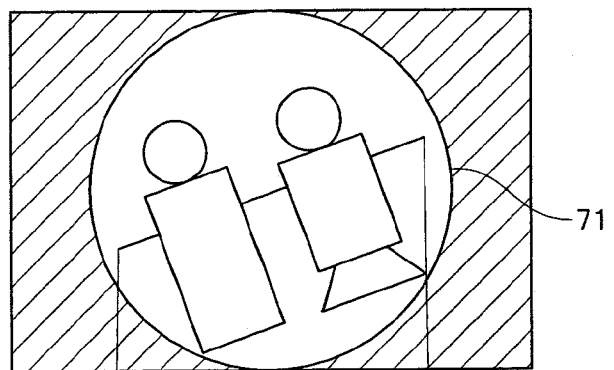
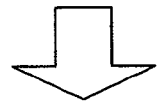
FIG.36C
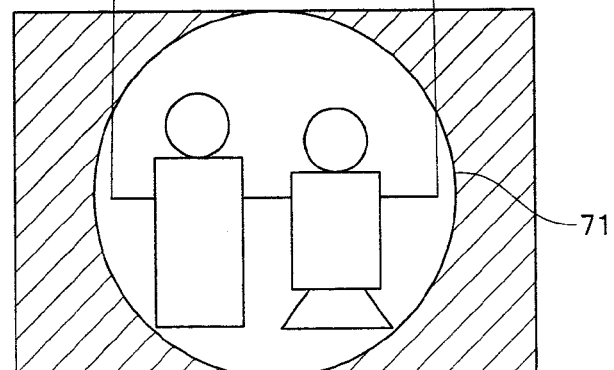

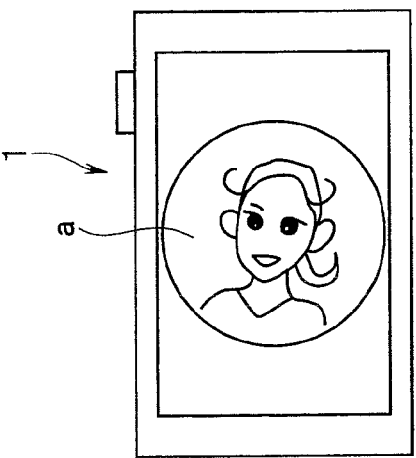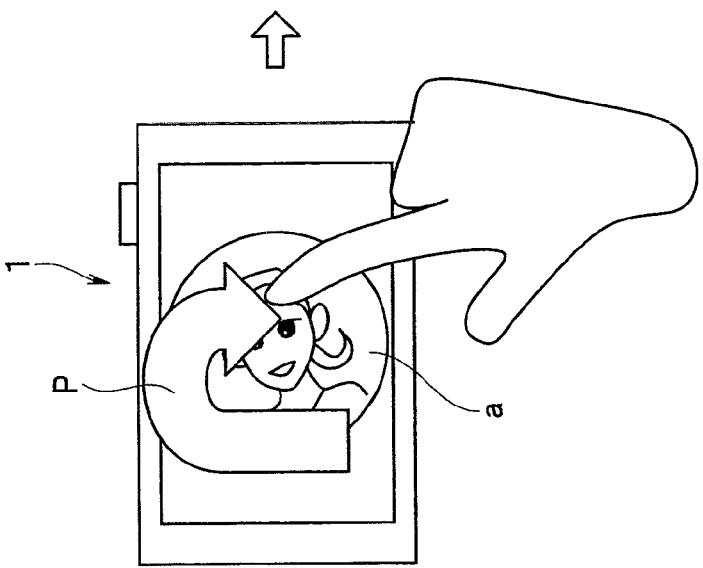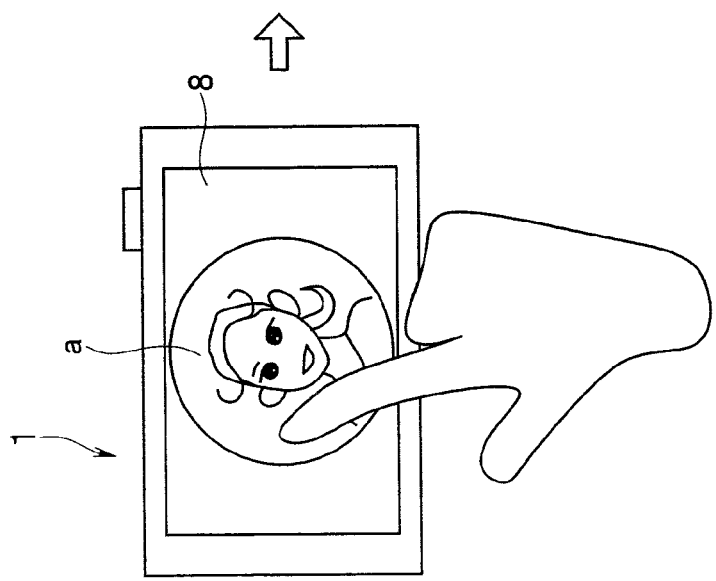

IMAGE PICKUP APPARATUS AND IMAGE ACQUISITION METHOD

BACKGROUND OF THE INVENTION

1. Field of the Invention

The present invention relates to an image pickup apparatus, and particularly to an image pickup apparatus which allows the execution of shooting operation without holding up the apparatus by hand and also without looking through a finder to settle a picture composition.

2. Description of the Related Art

Conventionally, image pickup apparatuses such as a digital camera, which is configured to be able to sequentially convert an optical image formed by a shooting optical system into an image signal with a photoelectric conversion device such as a solid image-pickup device, and record a thus obtained image signal in a recording medium as image data of a predetermined form, and to comprise an image display apparatus such as a liquid crystal display apparatus (LCD) which reproduces and displays the image data recorded in the recording medium as an image, have been generally commercialized and are in widespread use.

The image data which is acquired by a conventional image pickup apparatus of the above described form is primarily digital data. Such digital data is very easy to handle. For example, in a conventional image pickup apparatus, the image data acquired by an image pickup device is subjected to various kinds of signal processing by using an internal processing circuit. It is also configured that thus generated image data after signal processing is recorded in an image recording medium.

Further, in a conventional image pickup apparatus, it is made possible to constantly acquire adequate images while coping with various kinds of shooting conditions by appropriately executing various signal processing on the image signal acquired by a solid image-pickup device, etc. using a processing circuit in the image pickup apparatus.

On the other hand, in recent years, as a result of the advancement of digitization of image pickup apparatuses, the degree of freedom in the layout of the internal mechanism has increased thereby enhancing downsizing and portability. Thus, elaborately designed apparatuses which allow shooting in a wearable fashion have been commercialized. For example, the configuration is such that the device is reduced in size and thickness so as to be easily put into a pocket of clothes, etc., or is reduced in weight so as to be attached to clothes, etc. using a clip, etc., or is reduced in weight so as to be carried with ease by being hung from the neck, etc. with a strap in place of an accessory.

By the way, in a conventional image pickup apparatus, it is usual means for the photographer (user) to actuate an actuation member such as a release button that is linked with a mechanical switch, etc. as the actuation to start a shooting operation.

In this case, when actuation of the actuation member such as a release button, etc. is performed, first a preliminary operation of the shooting operation, that is, an automatic exposure setting operation, an automatic focusing operation, an automatic white balance operation, and so on are executed, and thereafter a release operation, that is, an exposure operation in which an image pickup device, a shutter mechanism, an diaphragm mechanism, and the like are driven, and a series of operation processing such as a subsequent image processing operation, a recording operation, and son on are successively executed.

In image pickup apparatuses of recent years, various proposals on actuation systems of different schemes from conventional ones, such as one in which a series of shooting operation processing can be executed, for example, by the photographer touching the surface of an image display apparatus with a finger in place of the actuation member such as a release button, etc., have been made by, for example, Japanese Patent Application Laid-Open Publication No. 2007-36492.

In conventional image pickup apparatuses such as the image pickup apparatus disclosed by the above described Japanese Patent Application Laid-Open Publication No. 2007-36492, it is predicated that a series of shooting operations are started by performing a predetermined actuation in a state in which the photographer holds the image pickup apparatus, or in a state in which the image pickup apparatus itself is fixed by using a tripod, etc.

Further, in recent years, various contrivances to enable the photographer to execute a desired shooting operation without holding the image pickup apparatus are proposed by, for example, Japanese Patent Application Laid-Open Publication No. 2006-60584 and others.

The image pickup apparatus disclosed by the above described Japanese Patent Application Laid-Open Publication No. 2006-60584 is configured such that a main body portion having a display apparatus is affixed to the palm or the back of hand, and an image pickup portion is affixed to the finger, respectively, and that detection means for detecting bends of plural fingers is provided, the detection means adapted to perform the control to switch operation modes in response to the state of the bends of the plural fingers detected by the detection means.

For example, while one is acting in an outdoor environment, etc., it is often the case that one's both hands are occupied. Even in such a case, there may be a desire to perform shooting in a wearable fashion without holding the image pickup apparatus in hand.

For example, when a photographer performs normal shooting with the both hands thereof being free, he or she can settle a picture composition and perform shooting while observing a display portion 127 provided in the back surface of an image pickup apparatus 111 by grasping the both sides thereof with both hands as shown in FIG. 40. In this case, since the photographer firmly holds the image pickup apparatus 111 with both hands, he or she can actuate a release button thereby performing shooting at a timing when a picture composition intended by the photographer is obtained.

However, in a state in which the image pickup apparatus 111 is put into a pocket 110 as shown in FIG. 41 and both hands are occupied, touching a shutter button of the image pickup apparatus 111 is difficult, and therefore shutter releasing cannot be performed.

Accordingly, for example, Japanese Application Patent Laid-Open Publication No. 2003-224761 discloses an image pickup apparatus which performs shooting when an object becomes oriented in a desired direction. The image pickup apparatus disclosed in Japanese Patent Application Laid-Open Publication No. 2003-224761 automatically performs a shooting operation upon detecting the face of an object being properly oriented, and therefore is suitable for a self-shooting mode in which the photographer itself is photographed as the object.

Further, Japanese Patent Application Laid-Open Publication No. 2007-036492 discloses a digital camera which comprises release buttons on the left and the right sides, and allows the user to set which of the release buttons to enable with a touch panel. It is suggested that either one of the left and right release buttons is enabled when performing a self-shooting.

SUMMARY OF THE INVENTION

An aspect of the present invention is an image pickup apparatus, provided with an image pickup portion, and a recording portion that records an image signal based on an output signal from the image pickup portion, the image pickup apparatus characterized by comprising: a posture detection portion that detects a posture change or a moving situation of the image pickup apparatus; and a control portion that controls the execution of a shooting operation based on an output signal of the posture detection portion.

The benefits of the present invention will be made clearer by the following detailed description.

BRIEF DESCRIPTION OF THE DRAWINGS

FIG. 5 is a diagram showing an outline structure and the effects of a touch panel in the image pickup apparatus of FIG. 1, in which

FIG. 17 is a diagram showing a posture change (when a swing motion is performed from a true position with respect to the gravitation direction) of the image pickup apparatus under the use situations of FIG. 15 and FIG. 16;

FIG. 18 shows examples of the shooting result during a continuous shooting operation by the image pickup apparatus of FIG. 1, in which FIG. 18A shows an example in which an overlapping area is large, and FIG. 18B shows an example of an appropriate overlapping area, and FIG. 18C shows an example in which no overlapping area is obtained, respectively;

FIG. 22 is a conceptual diagram to illustrate the flow of a synthesizing image processing to be executed based on the shooting result of FIG. 19, in which FIG. 22A is a diagram showing individual images of a continuous shooting result of FIG. 19, and FIG. 22B is a diagram to illustrate a synthesizing image processing based on the images of FIG. 22A;

FIG. 28 is a diagram showing a manner, in which an image pickup apparatus in a no-finder state is carried, in the image pickup device of the second embodiment of the present invention;

FIG. 32 is a diagram showing no-finder shooting when a clip is provided in the image pickup device of the second embodiment of the present invention, in which FIG. 32A is an external view of the image pickup apparatus having a clip, and FIGS. 32B and 32C are diagrams showing a state in which the image pickup apparatus is contained in a chest pocket;

FIG. 33 is a diagram to illustrate the determination of whether or not it is in a no-finder state in the image pickup device of the second embodiment of the present invention, in which

FIG. 34 is a diagram to illustrate inclination correction processing in the image pickup device of the second embodiment of the present invention, in which an example of a shot image in which the horizon is inclined (FIG. 34A), and an example of a rectangular image which is obtained by performing the inclination correction processing (FIG. 34B);

FIG. 35 is a diagram to illustrate inclination correction processing in the image pickup device of the second embodiment of the present invention, in which an example of image which is obtained by subjecting the shot image in which the horizon is inclined, to circular trimming processing (FIG. 35A), and an example of circular image which is obtained by performing the inclination correction processing (FIG. 35B);

FIG. 36 is a diagram showing a manner in which a circular image is generated from a shot image and is further subjected to an inclination correction, in the image pickup device of the second embodiment of the present invention;

FIG. 37 is a diagram showing a reproduced image during reproduction in the image pickup device of the second embodiment of the present invention;

DETAILED DESCRIPTION OF THE PREFERRED EMBODIMENTS

Figure 1:
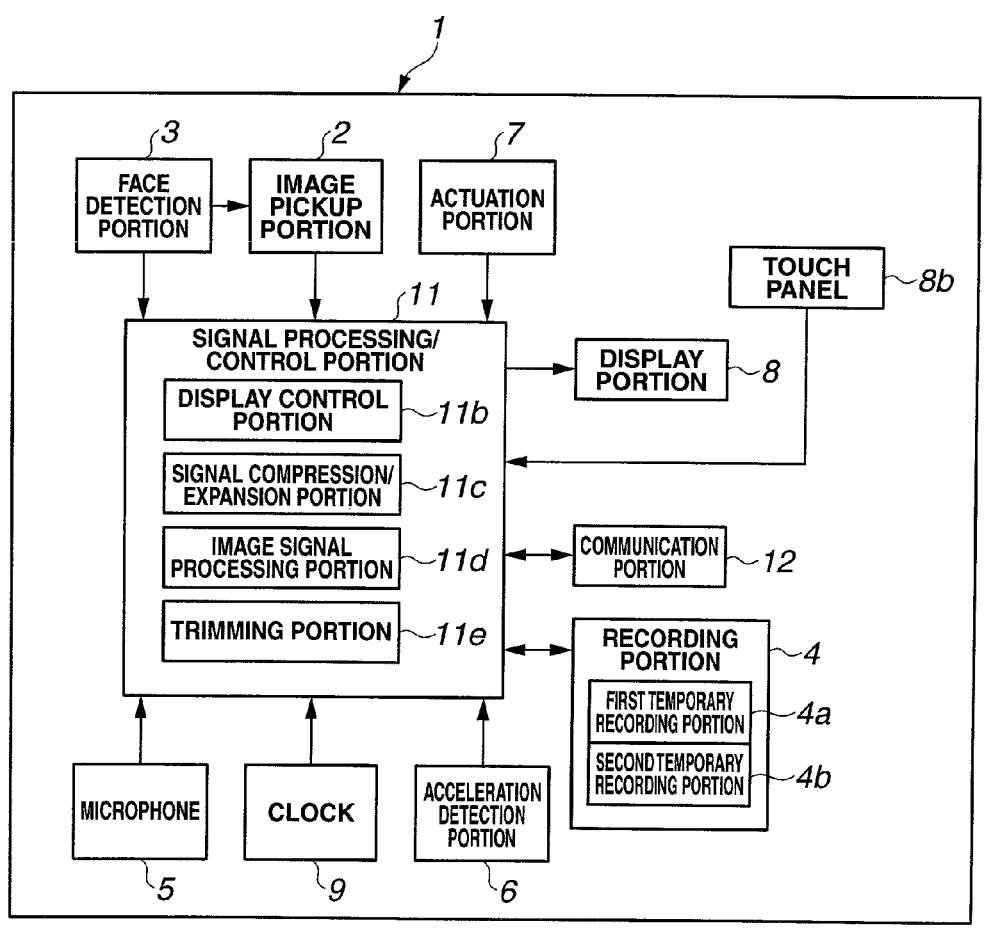
FIG. 1 is a block configuration diagram primarily showing the electrical configuration in the outline of the internal configuration of an image pickup apparatus of an embodiment of the present invention.

Each embodiment of the present invention shows, as an example, an image pickup apparatus such as a digital camera, which is configured such that for example, an optical image formed by an optical lens is photoelectrically converted by using a solid image-pickup device, the resulting image signal is converted into digital image data representing a static image or a dynamic image, and thereafter the generated digital image data is recorded into a recording medium, as well as a static image or a dynamic image based on the digital image data recorded in the recording medium is reproduced and displayed by using a display apparatus.

It is noted that in each drawing to be used in the following description, each component is differently scaled such that each component has a recognizable size on the drawing, and the present invention will not be limited to the number of components, the shapes of components, the size ratios between components, and the relative positional relationship between respective components stated in the drawings.

First Embodiment

FIGS. 1 to 20 are diagrams to illustrate a first embodiment of the present invention. First, primarily the electrical configuration in the outline of the internal configuration of an image pickup apparatus of a first embodiment of the present invention will be described below using the block configuration diagram of FIG. 1.

An image pickup apparatus 1 of the present embodiment is configured to comprise an image pickup portion 2, a face detection portion 3, a recording portion 4, a microphone 5, an acceleration detection portion 6, an actuation portion 7, a display portion 8, a touch panel 8b, a clock 9, a signal processing/control portion 11, a communication portion 12, a lens unit 20 (not shown in FIG. 1; see FIG. 3, etc.), and others.

The signal processing/control portion 11, which is a control circuit for centrally controlling the entire image pickup apparatus 1, receives various signals inputted from each building block in the image pickup apparatus 1 to perform various kinds of control processing. The signal processing/control portion 11 is made up of a CPU (Central Processing Unit) and a hardware circuit, etc. in the periphery thereof, and controls the entire image pickup apparatus 1 according to a software program stored in a storage portion not shown or the recording portion 4. The signal processing/control portion 11 contains circuit portions such as a display control portion 11b, a signal compression/expansion portion 11c, an image-signal manipulation processing portion 11d, and a trimming portion 11e.

Among those, the display control portion 11b is a control portion that performs the control relating to display for the display on the display screen of the display portion 8, such as the control of a continuous display (a live view display) of real time image based on the image signal successively outputted from the image pickup portion 2, the control of reproduction and display of recorded images, and the control of a menu display for various settings, the control of the display for actuations corresponding to a touch panel 8b (for example, the display of a software keyboard).

The signal compression/expansion portion 11c is a processing circuit that receives an image signal acquired by the image pickup portion 2 to execute a signal compression processing for converting the image signal into image data in an optimum form to be recorded in a recording medium, and reads compressed image data recorded in the recording medium to perform signal processing such as a signal expansion processing for converting the image data into an image signal in an optimum form to be reproduced and displayed using for example the display portion 8, etc. It is noted that the signal compression/expansion portion 11c is configured to be able to handle the compression/expansion processing of voice signals, besides the compression/expansion processing of image signals (static images, dynamic images). Further, general examples of the file compression scheme for image data by the signal compression/expansion portion 11c include, for example, JPEG, TIFF, and the like, but various kinds of compression schemes, without being limited to these, may be applied.

The image-signal manipulation processing portion 11d is a processing circuit that performs a predetermined signal processing for applying a predetermined image manipulation based on plural image signals, which are image signals acquired by the image pickup portion 2 and temporarily recorded in a first temporary recording portion 4a described later, for example, an image synthesis processing such as panorama synthesis processing (an image joining processing) and the like.

The trimming portion 11e is a processing circuit that performs trimming processing for applying a cut-off manipulation of a necessary image area based on an image signal which is a synthesized image signal generated by the above described image-signal manipulation processing portion 11d and is temporarily recorded in a second temporary recording portion 4b described later.

The image pickup portion 2 is primarily configured to include a lens unit 20 which is a shooting lens having a zooming function (a zoom lens), an exposure control portion such as a shutter and a diaphragm, an image pickup device, a driving and reading circuit of the image pickup device, a signal processing circuit for performing a preprocessing of the image signal generated by the image pickup device. The image pickup portion 2 receives an object image formed by the lens unit 20, with an image pickup device such as a photoelectric device, etc., and converts the image into an electric signal corresponding to the object image to output the image signal to the signal processing/control portion 11.

It is noted that a solid image-pickup device such as a CCD (Charge Coupled Device), a CMOS (Complementary Metal Oxide Semiconductor), and the like is applied as the image pickup device, which is a photoelectric conversion device, included in the above described image pickup portion 2.

The face detection portion 3 is a building block for implementing a so-called face detection function that detects whether or not, for example, a face area of a person is included within an image based on the image signal acquired by the image pickup portion 2. Further, upon detecting that a face area is included in the image, the face detection portion 3 detects the position and the size of the face area in the image. The sensing result by the face detection portion 3 is outputted to the signal processing/control portion 11.

It is noted that the technologies to implement such face detection function are conventionally in wide spread use in image pickup apparatuses. It is supposed that a technology similar to conventional ones is applied in the image pickup apparatus 1 of the present embodiment, thus omitting detailed description thereof.

The recording portion 4 is made up, for example, of a recording medium for receiving, recording and accumulating image data for recording, which is acquired by the image pickup portion 2, applied with various kinds of signal processing in the signal processing/control portion 11, and finally generated in the signal compression/expansion portion 11c, a driving circuit that drives the recording medium, for example, for a recording processing of image data, and a reading processing of the recorded image data for the recording medium, and the like. The recording medium may be in a form to be fixedly disposed within the image pickup apparatus 1, or in a form to be detachably configured with respect to the image pickup apparatus 1. In general, a semiconductor memory of a card shape, which is detachably disposed with respect to the image pickup apparatus 1, and the like are applied.

It is noted that image data for recording, which corresponds to an image signal that is generated by being subjected to trimming processing at the trimming portion 11e (that is, an image signal representing an image of the final form to be acquired by an automatic shooting mode to be described below) is recorded in the recording portion 4, as well.

Further, the recording portion 4 in the image pickup apparatus 1 of the present invention contains a first temporary recording portion 4a and a second temporary recording portion 4b. The first temporary recording portion 4a and the second temporary recording portion 4b are made up of, for example, a temporary storage portion such as an SDRAM.

The first temporary recording portion 4a is a recording area for temporarily recording a plurality of image signals corresponding to a plurality of static images that are successively acquired by the image pickup portion 2 when a shooting operation is executed in the above described automatic shooting mode.

The second temporary recording portion 4b is a recording area for temporarily recording a synthesized image signal generated by the image-signal manipulation processing portion 11d of the signal processing/control portion 11.

The microphone 5 is a constituent portion that converts voice, etc. into an electric signal. The voice signal acquired by the microphone 5 is subjected to a predetermined signal processing in the signal processing/control portion 11 and thereafter is recorded as voice data into a recording medium of the recording portion 4.

It is noted that as the predetermined signal processing to be applied to the voice signal for recording in the signal processing/control portion 11, various kinds of processing such as a compression processing, a conversion processing into voice data for recording, or a correlation processing with image data is appropriately executed according to operation modes and set conditions.

In an ordinary case, voice data is recorded by simultaneously performing a voice recording operation during the shooting operation of a dynamic image or static image, as well as is recorded during an operation mode for recording voice alone.

Further, in the image pickup apparatus 1 of the present embodiment, a voice signal acquired by the microphone 5 may be recorded during a predetermined operation mode, as well as be utilized for detecting a primary object 101 from a plurality of images acquired by an automatic shooting mode (as will be described later in detail).

The acceleration detection portion 6 is a posture detection portion that detects a posture change and a moving situation of the image pickup apparatus 1, and vibrations applied to the image pickup apparatus 1. The acceleration detection portion 6 is made up of: a detection sensor made up of a plurality of acceleration sensors, etc. which are disposed within the main body of the image pickup apparatus 1 and detect accelerations; a driver thereof; a circuit that receives output signals of the detection sensor and generates a predetermined instruction signal; and the like. It is noted that an angular velocity sensor (a gyroscope) for detecting angular velocities may be applied in place of the above described acceleration sensors. Moreover, an orientation sensor such as a geomagnetic sensor may be utilized for the posture detection in the horizontal rotational direction.

That is, the acceleration detection portion 6 is a constituent portion that detects a holding state of the image pickup apparatus 1 by the photographer, that is, a camera shake state, a posture state such as an inclination state, and a moving situation of the image pickup apparatus 1 by detecting gravitational accelerations and vibrations, etc. applied to the image pickup apparatus 1 in which the acceleration detection portion 6 is disposed.

In the image pickup apparatus 1 of this embodiment, a camera shake compensation function (shake correction operation) is implemented by driving and controlling a camera shake compensation mechanism under the control of the signal processing/control portion 11 based on the detection result of the acceleration detection portion 6.

In addition to this, in the image pickup apparatus 1 of the present embodiment, it is configured that an output signal of the acceleration detection portion 6 is utilized for the control when a shooting operation is performed. For example, the acceleration detection portion 6 is used as the means for detecting a no-finder state, and the like. Further, it is possible to determine whether or not the photographer has performed a motion such as bending backward. As described later, when the bending backward motion is performed, the control to execute a release operation, or the like is performed.

Next, the configuration and effects of the detection sensors in the acceleration detection portion 6 will be described by using FIGS. 2, 3, and 4.

As described above, the acceleration sensor that makes up the acceleration detection portion 6 detects vibrations applied to the image pickup apparatus 1 and performs a posture detection of such as whether or not the photographer has performed a bending backward motion, or whether or not the image pickup apparatus 1 is in a posture peculiar to the no-finder state.

Figure 2:
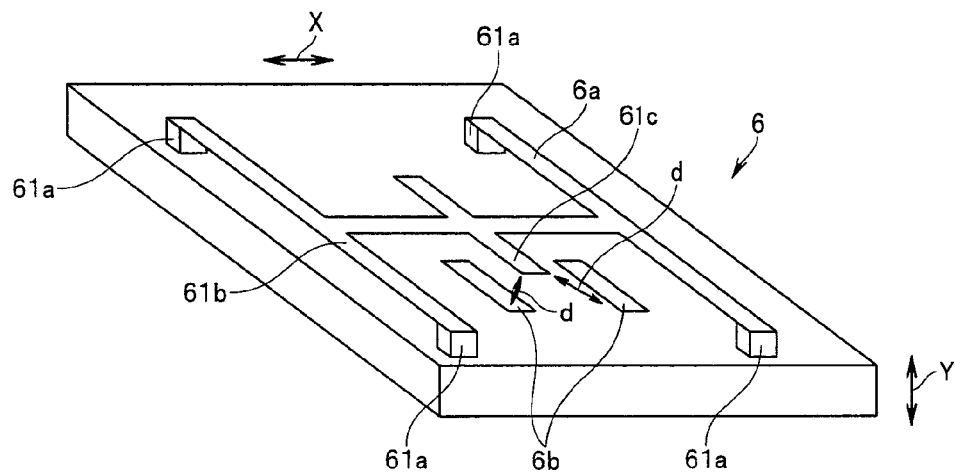
FIG. 2 is a perspective view showing an outline of the structure of an acceleration detection portion taken out from the image pickup apparatus of FIG. 1.

The detection sensor in the acceleration detection portion 6 in the image pickup apparatus 1 of the present embodiment is made up of a bridged metal portion 6a and two fixed metal portions 6b of the chip surface, as shown in FIG. 2, and is fabricated by, for example, a MEMS process. The detection sensor is structured such that the positions of the metal portion 6a and the fixed metal portion 6b will be changed by acceleration.

The metal portion 6a is made up of four base points 61a, an H-shaped bridge portion 61b held by the base points 61a, and a movable portion 61c that is provided diagonally opposite to and to be opposed to the fixed metal portion 6b. The acceleration sensor detects the capacitance of a capacitor formed of the movable portion 61c and the fixed metal portion 6b.

The thus configured detection sensor of the acceleration detection portion 6 is configured such that, when the posture thereof changes, the metal portion 6a gets deflected depending on the condition in which the gravity is applied to the detection sensor. This will cause a relative positional change between the metal portion 6a and the fixed metal portion 6b resulting in a change of the output signal.

That is, when the posture of the image pickup apparatus 1 changes, the direction in which the gravitational force acts changes thereby causing the movable portion 61c to be deflected to result in a change in the distance between the metal portion 6a and the fixed metal portion 6b. This will change the capacitance of the capacitor formed of the movable portion 61c and the fixed metal portion 6b. Determining the amount of change in this occasion makes it possible to detect an acceleration α, for example, in the direction of the arrow X as shown in FIG. 2.

Figure 3:
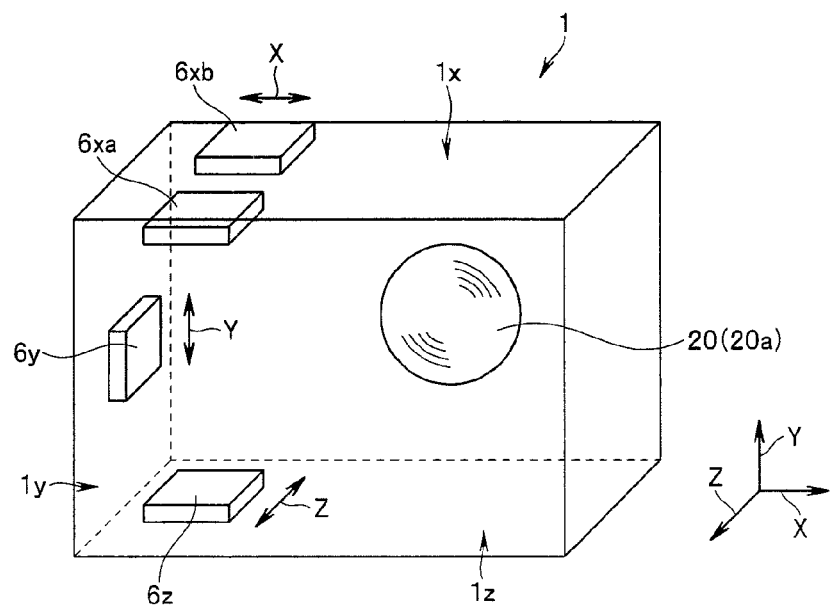
FIG. 3 is a layout diagram showing an outline of the layout status of the acceleration detection portion in the image pickup apparatus of FIG. 1.

Suppose that a detection sensor of such form is disposed on each surface portion of a top surface 1x, one side surface 1y, and a bottom surface 1z in the interior of the image pickup apparatus 1 as shown in FIG. 3.

In such a case, the detection sensors to be disposed on the top surface 1x of the image pickup apparatus 1 are designated by reference characters 6xa and 6xb, the detection sensor to be disposed on one side surface 1y by a reference character 6y, and the detection sensor to be disposed on the bottom surface 1z by a reference character 6z, respectively.

Here, suppose that the surface on which the shooting lens 20a of the lens unit 20 of the image pickup apparatus 1 is provided is referred to as a front surface of the image pickup apparatus 1. Moreover, suppose that the optical axis of the shooting lens 20a is disposed in the direction orthogonal to the front surface of the image pickup apparatus 1. Furthermore, suppose that as shown in FIG. 3, the direction along the optical axis of the shooting lens 20a is referred to as a Z direction, the direction horizontally orthogonal to the Z direction as an X direction, and the direction vertically orthogonal to the Z direction as a Y direction, respectively.

Thus, it is supposed that the top surface 1x and the bottom surface 1z of the image pickup apparatus 1 are made up of surfaces including the X direction and the Z direction. At this time, the top surface 1x and the bottom surface 1z are spaced apart by a predetermined distance so as to be opposed to each other. Moreover, the one side surface 1y of the image pickup apparatus 1 is supposed to be formed of a surface including the Y direction and the Z direction.

In this case, the detection direction of the detection sensors 6xa and 6xb is set and disposed such that the detection sensors 6xa and 6xb detect a posture change and a moving situation in the X direction. Moreover, the detection direction of the detection sensor 6y is set and disposed such that the detection sensor 6y detects a posture change and a moving situation in the Y direction. The detection direction of the detection sensor 6z is set and disposed such that the detection sensor 6z detects a posture change and a moving situation in the Z direction.

Conceivable situations in which the posture of the image pickup apparatus 1 changes (including abrupt movement changes) include, for example, one in which the photographer picks up the image pickup apparatus 1 from a state in which it is put on a desk, etc., one in which the photographer turns the image pickup apparatus 1 to any direction from a state in which it is held by hand (a swing motion, a turn around motion, etc.), and the like.

When a posture change as described above takes place, it is made possible to determine how the image pickup apparatus 1 has moved, and how its posture has changed by monitoring the changes of the output signals of each of detection sensors 6xa, 6xb, 6y, and 6z, which are placed at predetermined sites within the image pickup apparatus 1, in correspondence with the three axes of X axis, Y axis, and Z axis.

Moreover, regarding the X axis direction, although it is enough to provide one detection sensor to detect a movement in the same horizontal direction, providing two detection sensors 6xa and 6xb makes it possible to detect a situation such as in which the image pickup apparatus 1 is moved in such a way to be rotated around the Y axis out of the axes orthogonal to the optical axis while being moved only in the horizontal direction with respect to the horizontal surface. In this case, the determination becomes possible as a result of that a difference in acceleration will be detected between the detection sensor (6xa) that is located outside the rotation radius and the detection sensor (6xb) that is located inside the rotation radius when the image pickup apparatus 1 is rotated in a predetermined direction. It is noted that a geomagnetic sensor (orientation sensor) may be used for the rotational direction.

Moreover, to be brief, it is possible to find in which way the image pickup apparatus 1 is moved based on whether the acceleration α is plus or minus when the image pickup apparatus 1 is moved. Therefore, in the present embodiment, in order to make it possible to detect whether the image pickup apparatus 1 is moved in the up and down direction (the Y direction) or in the left and right direction (the X direction), each acceleration sensor is respectively disposed within the image pickup apparatus 1.

To be specific, for example in the present embodiment, it is configured that a plurality of acceleration sensors (6xa, 6xb, 6y, 6z) are disposed at three locations (the top surface, side surface, and lower surface) within the main body of the image pickup apparatus 1 so as to be able to detect accelerations (αx, αy, αz) in three directions of the X axis, Y axis, and Z axis as shown in FIG. 3.

In this case, two acceleration sensors 6xa and 6xb are disposed in a direction in which acceleration αx in the direction of arrow X (the left and right direction) can be detected, on the inner surface side of the top surface 1x of the image pickup apparatus 1.

Moreover, the acceleration sensor 6y is disposed in a direction in which acceleration αy in the direction of arrow Y (the up and down direction) can be detected, on the inner surface side of one side surface 1y of the image pickup apparatus 1.

Further, the acceleration sensor 6z is disposed in a direction in which acceleration αz in the direction of arrow Z (the same direction as that of the optical axis of the shooting lens 20a) can be detected, on the inner surface side of the bottom surface 1z of the image pickup apparatus 1.

Figure 4:
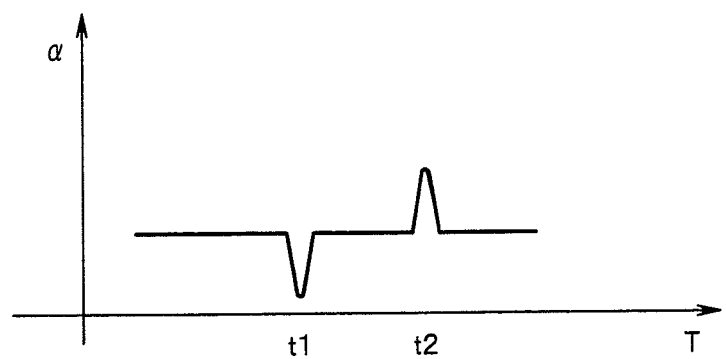
FIG. 4 is a graph showing an example of the signal output of the acceleration detection portion in the image pickup apparatus of FIG. 1.

These acceleration sensors output signals for example shown in FIG. 4 when the image pickup apparatus 1 is moved in each direction of arrows X, Y, and Z shown in FIG. 3. It is supposed that the lateral axis represents time T and the longitudinal axis represents acceleration α.

For example, if the image pickup apparatus 1 is moved in one direction at a time t1 shown in FIG. 4, a pulsed signal which is convex toward a minus side with respect to a steady state as shown in FIG. 4 will be outputted. Moreover, if the image pickup apparatus 1 is moved in the other direction at a time t2, a pulsed signal which is convex toward a plus side with respect to a steady state will be outputted as shown in FIG. 4. Detecting such output signals from each acceleration sensor enables the detection of posture change and moving situation, etc. of the image pickup apparatus 1.

At this time, a pulsed signal to be outputted may be determined with reference to the gravitational acceleration. Since ordinarily there is no movement of a human body at a speed of a falling object excepting when walking or running, the determination may be performed with a value of about half of the gravitational acceleration as a threshold. In this case, although during walking or running, vibrations thereof will be detected, it becomes possible to determine motions as in the present invention, after having eliminated such components, having neglected those changes in a predetermined direction, or having determined that the photographer has come to a standstill.

Referring back to FIG. 1, the actuation portion 7 is made up of: various actuation members (not shown) provided on the outer surface of the image pickup apparatus 1; a plurality of switches which are linked with those actuation members, respectively; a processing circuit that transfers an instruction signal, which is generated by an actuation member being actuated by the photographer, to the signal processing/control portion 11; and the like. The actuation portion 7 includes various actuation members, such as a shutter release button, an operation mode switching dial, a power source button, a reproduction button, a zoom lever, and a menu button, etc., and switches which are linked with each of those actuation members. An instruction signal is generated from the actuation portion 7 by the photographer arbitrarily actuating an actuation member. The instruction signal is transferred to the signal processing/control portion 11.

The display portion 8 is a display apparatus that displays an image display based on the image signal for display resulting from the signal processing by a display control portion 11b of the signal processing/control portion 11, a setting menu display, a display for actuations, and the like. In order for that, the display portion 8 is connected the display control portion 11b of the signal processing/control portion 11. The display portion 8 is disposed at a site near the back surface inside the image pickup apparatus 1 such that the display screen thereof is directed toward the outer surface. For example, a liquid crystal display (LCD) apparatus, an organic EL display, or the like is applied as the display portion 8.

When using the image pickup apparatus 1 in a shooting operation mode, the photographer determines a picture composition and a timing of shutter releasing while watching a real time image displayed on the above described display portion 8. That is, at the time of shooting operation, the display portion 8 primarily functions as a finder.

Moreover, when the setting menu display is displayed on the display portion 8, the photographer is allowed to perform actuation of selecting various settings of the image pickup apparatus 1 by using various actuation members. Further, when the image pickup apparatus is used in a reproduction operation mode, an image based on the recorded image data, or the like is displayed on the display portion 8.

In addition to that, it is supposed that the display portion 8 in the present embodiment includes a voice output apparatus, such as a speaker that generates voices based on a voice signal acquired by the microphone 5, or voice data etc. recorded in the recording portion 4.

Further, the display portion 8 is integrally formed with a touch panel 8b. The touch panel 8b is actuation means which is made up of a position input apparatus that is disposed on the display screen (for example, inside a liquid crystal display) of the display portion 8, and a display to be used for actuation, which is displayed on the above described display portion 8.

That is, when the photographer performs a predetermined touch actuation (a contact actuation) on the touch panel 8b, the touch panel 8b generates and outputs a signal relating to the position or the area, at or in which the touch actuation is performed, to the signal processing/control portion 11. Upon receiving this, (a touch point determination portion (not shown) of) the signal processing/control portion 11 detects and determines a touch point, etc. of a touch actuation on the display screen of the display portion 8. Further, the signal processing/control portion 11 detects and determines how the photographer moves his/her finger during touch actuation by detecting changes of touch actuation, etc.

Next, the display control portion 11b is adapted to control the content to be displayed on the display screen of the display portion 8 according to the detection result of touch actuation on the touch panel 8b. In this way, the touch panel 8b serves to assist the actuation by the actuation portion 7.

For example, when the actuation portion 7 or the touch panel 8b is actuated by the photographer while the image pickup apparatus 1 is being operated in a predetermined shooting mode (for example, a program shooting mode) in the shooting operation mode (and when in a power-on state), the setting for switching to another shooting mode (for example, an aperture-priority automatic exposure (AE) mode, a shutter speed-priority automatic exposure mode, and the like) in the shooting operation mode, and any setting change for individual shooting conditions in each shooting mode can be performed with ease.

Furthermore, in the present embodiment, the touch panel 8b has a function to detect a no-finder state during a shooting operation as will be described below.

The configuration of the touch panel 8b to be applied is substantially the same as those applied to image pickup apparatuses such as commercialized digital cameras that are conventionally in wide spread use.

Here, an outline of the configuration of the touch panel 8b and an outline of the effects thereof will be described by using FIG. 5. As described above, the touch panel 8b detects a touch position of a user on the display surface of the display portion 8 and detects whether or not the back surface of the image pickup apparatus 1 is in a covered state.

Figure 5A:
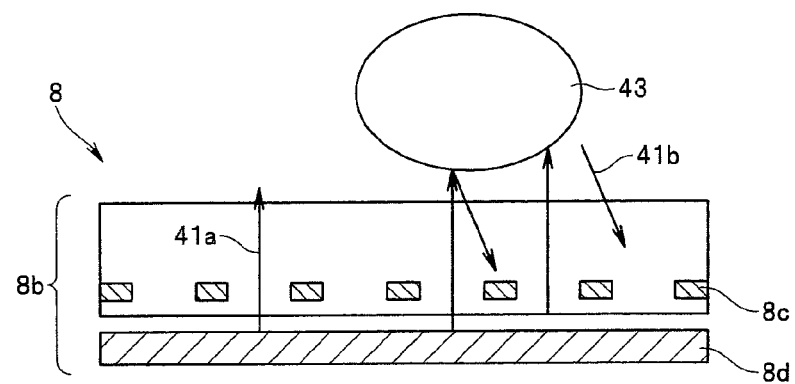
FIG. 5A is a sectional view of panel in a state in which a finger of the photographer is near the surface of the touch panel.
Figure 5B:
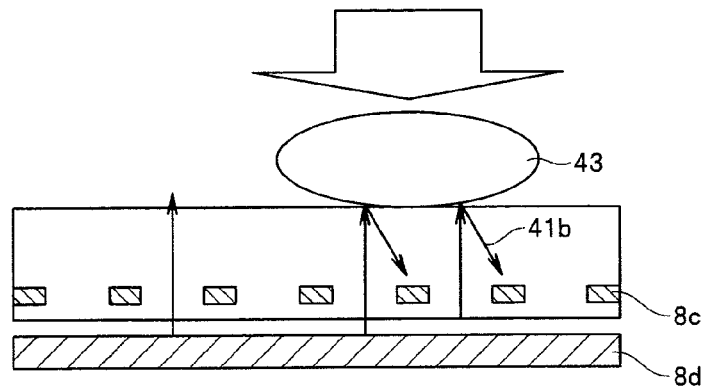
FIG. 5B is a sectional view of panel in a state in which touch actuation is being performed with a finger being in close contact with the surface the touch panel.

FIG. 5A schematically shows a section of a panel in a state in which a finger 43 of the photographer is close to the touch panel 8b. Moreover, FIG. 5B schematically shows a section of a panel in a state in which the finger 43 of the photographer is in close contact with the touch panel 8b.

The touch panel 8b in the present embodiment is configured, for example, in a form in which a plurality of optical sensors 8c are two-dimensionally disposed at a predetermined spacing in a matrix shape in a liquid crystal portion of the display portion 8. Moreover, a back light 8d is disposed on the back surface side of the touch panel 8b. A ray of light in the direction shown by an arrow 41a is emitted from the back light 8d, and the emitted light is projected toward the display surface side of the display portion 8.

At this time, if an object, for example, an object 43 such as a finger is present on the display surface or near the display surface of the display portion 8, the emitted light 41a of the back light 8d is projected to the object. Then, a reflected light 41b thereof is reflected toward the optical sensor 8c. When the optical sensor 8c receives the reflected light 41b, it becomes possible to detect a touch position based on the light receiving position.

Further, when the emitted light 41a from the back light 8d is not reflected by the object 43, the emitted light 41a is directly diverged to the outside as shown in FIG. 5A.

On the other hand, when the object 43 such as a finger of the photographer is located at a position near the display surface of the touch panel 8b, although slightly spaced apart therefrom, the emitted light 41a is reflected by the object 43 as shown in FIG. 5B. Then, part of the reflected light 41b is received by the optical sensor 8c. This causes the optical sensor 8c to output a detection signal. Upon receiving this, the signal processing/control portion 11 will detect a touch position based on the position of the optical sensor 8c corresponding to the detection signal of that time.

On the other hand, for example, when touch actuation is performed at plural positions, corresponding plural optical sensors 8c will respond thereto. In this case as well, detecting the positions of the optical sensors 8c allows plural touch positions to be detected, and a control processing is performed according to the touch positions at that time.

Further, even when it comes into a situation other than a touch actuation with finger, etc., the touch panel 8b can determine that situation. For example, when the image pickup apparatus 1 is hung from the neck with a strap, etc., or is contained in a pocket, the entire surface of the touch panel 8b of the display portion 8, in other words, the substantially entire surface of the back surface side of the image pickup apparatus 1 may be covered by clothes 45, etc. When it comes into such situations, the touch panel 8b of the present invention is adapted to be able to determine those situations.

Figure 5C:
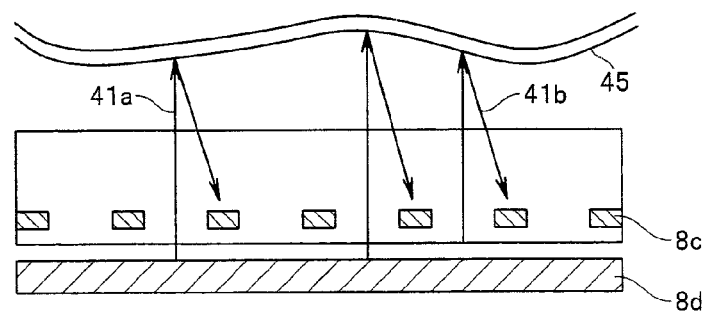
FIG. 5C is a sectional view of panel in a state in which the display surface of a display portion of the image pickup apparatus is covered.

FIG. 5C shows a state in which the back surface of the image pickup apparatus 1, that is, the display surface of the display portion 8 is being covered. This will result in a situation in which the emitted light 41a from the back light 8d is reflected substantially all over the surface by an object 45 such as clothes, etc. Thus, at this time, substantially all the optical sensors 8c receive the reflected light 41b and output detection signals to the signal processing/control portion 11.

In this way, when substantially all the optical sensors 8c detect the reflected light 41b, it can be inferred that the substantially entire surface of the back surface of the image pickup apparatus 1 is likely to be covered with the object 45. Therefore, in such a case, it can be determined that the image pickup apparatus 1 may be in a state of being hung from the neck, or being contained in a pocket.

Although, in the present embodiment, it is configured that a covered state of the back surface of the image pickup apparatus 1 is detected by the touch panel 8b, some other means other than the touch panel 8b may be used as the determination means particularly in this case.

Moreover, the structure of the touch panel 8b that is applicable to the image pickup apparatus 1 of the present embodiment includes, for example, a form of structure which is disposed on the liquid crystal panel that makes up the display portion 8, in addition to the form (the above described form) of structure which is integrally configured in a liquid crystal panel. Either form of structure is applicable.

Referring back to FIG. 1, the clock 9 is made up of a clock circuit that contributes to a clocking operation, etc. which is required in the control, etc. of the internal electric circuit in the present image pickup apparatus 1. Date and time information, etc. is outputted by the clocking function of the clock portion 9. During a shooting operation, date and time information data from the clock portion 9 is associated with (or attached to) shot image data and is recorded in a recording medium of the recording portion 4. It is noted that although an example in which the clock 9 is applied as a single building block is shown in the description of the present embodiment (see FIG. 1), in place of this, the configuration may be such that the clock 9 is included within the signal processing/control portion 11.

The communication portion 12 is made up of a communication circuit, etc. for performing communication to and from external equipment connected to the image pickup apparatus 1. Various forms of communication, such as wired communication by cable connection in conformity with the USB standard, and wireless communication based on wireless connection utilizing electromagnetic waves or infrared rays are applicable as the form of communication to and from external equipment. Using the communication portion 12 allows the image data, etc acquired by the present image pickup apparatus 1 to be outputted to the external equipment via the communication portion 12.

The lens unit 20 (see FIG. 3, etc.) is configured to include: a plurality of optical lenses that condense light flux from the shooting target (object) and cause an image to be formed on the light receiving surface of the image pickup portion 2; lens holding frames that hold the plurality of optical lenses respectively and a driving portion thereof; a diaphragm mechanism, a shutter mechanism, and a driving portion thereof, and other electric components, etc. The lens unit 20 to be applied is substantially the same as those applied to image pickup apparatuses such as commercialized digital cameras that are conventionally in widespread use. Therefore, when describing the configuration of the present embodiment, detailed illustration and description of the lens unit 20 will be omitted. It is noted that various forms of the lens unit 20 such as one in which the lens unit 20 is configured to be detachable to the image pickup apparatus 1, and one in which the lens unit 20 is integrated with the image pickup apparatus 1 may be applied.

Although the image pickup apparatus 1 of the present embodiment is configured to include various components other than the above described components, the configuration other than the above described components do not directly relate to the present invention. Therefore, the illustration of the configuration other than the above described components will be omitted in order to avoid complicatedness of drawings, and detailed description thereof will be omitted as they have similar configuration to that of conventional image pickup apparatuses.

The effects when performing a shooting by use of the thus configured image pickup apparatus 1 of the first embodiment of the present invention will be described below by using flow charts of FIGS. 6, 7, and 8, and FIGS. 9 to 21, etc.

Figure 9:
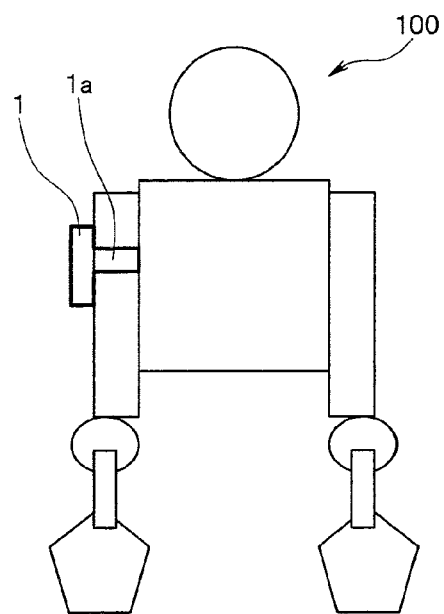
FIG. 9 is a diagram showing an example of the concrete situation when the camera control by the image pickup apparatus of FIG. 1 is executed.
Figure 10:
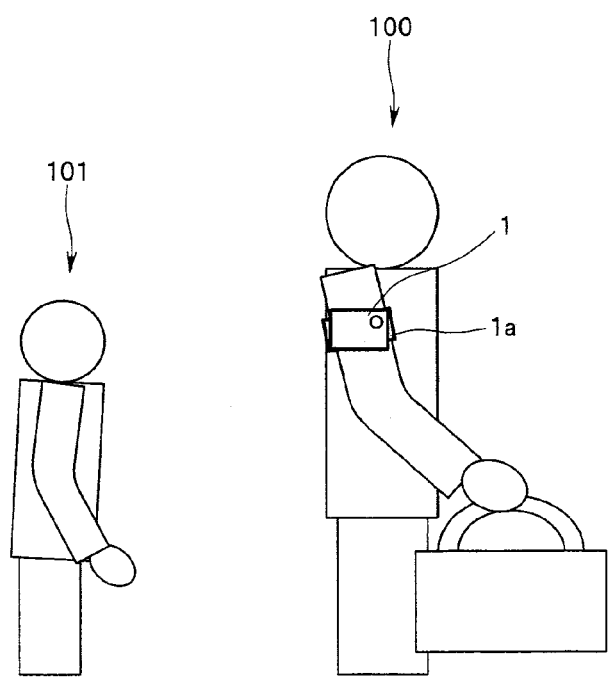
FIG. 10 is a diagram showing an example of the concrete situation when the camera control by the image pickup apparatus of FIG. 1 is executed.

First, general use situations when a processing sequence relating to the "camera control" by the image pickup apparatus 1 is executed will be briefly described by using FIGS. 9 and 10.

Now suppose that as shown in FIG. 9, a photographer 100 of the present image pickup apparatus 1 is in a situation in which he or she carries baggage with both hands when away from home, for example, and therefore the photographer 100 cannot hold the image pickup apparatus 1 by hand. Further, suppose that at that time, the photographer 100 is walking along with a child, which will be an object 101.

Even in such a situation, there are many instances for the photographer 100 to want to shoot the child as an object 101 as a shooting object. However, when the photographer 100 is in a situation in which he or she cannot hold the image pickup apparatus 1 by hand as described above, it is difficult to perform shooting with a conventional image pickup apparatus, and a precious moment with a child or a special shutter chance is likely to be missed.

Therefore, the image pickup apparatus 1 of the present embodiment is provided with an "automatic shooting mode" as a shooting mode for automatically performing a series of shooting processing sequences, in which even under such a situation, the photographer 100 activates the image pickup apparatus 1 with an intention of the photographer 100 such as by a predetermined behavior as a trigger without holding the image pickup apparatus 1 by hand, thereby performing a continuous shooting, and each image signal of thus acquired plurality of shot images is subjected to a predetermined signal processing (for example, an image synthesis processing, such as image a panorama synthesis processing, an image joining processing, and a trimming processing, and the like) so that thus generated synthesized image signals are recorded.

It is noted that for example, behavior of the photographer 100 holding the image pickup apparatus 1 to turn around toward the object 101 which is located in the back of the photographer 100 is assumed as the predetermined behavior as the trigger to start activation. Not only that, but in addition to that, using such technologies as detecting conversations (voices) between the photographer 100 and the object 101, and performing face detection of the object 101 based on the acquired image signal will make it possible to perform appropriate shooting more accurately. It is noted that when such supplementary technology is applied in combination, it is necessary to get a shooting operation started before performing such detections.

For that purpose, it is configured that the photographer 100 can fixedly hold the image pickup apparatus 1 of the present embodiment on its arm, etc. by use of a belt-like holding member 1a as shown in FIGS. 9 and 10. Where, when the photographer fixedly holds the image pickup apparatus 1 on its arm, etc., the image pickup apparatus 1 is fixed in a posture that will cause the shooting lens to face outward. Moreover, it is supposed that the image pickup apparatus 1 is in a power-on state so as to be able to execute shooting operation, and an operation mode is set in the shooting operation mode.

It is noted that the image pickup apparatus 1 needs not to be in a full power-on state, and but may be in a stand-by state such as by a power saving mode in which, for example, only part of the function of the signal processing/control portion 11 is activated and building blocks having relatively high power consumption, such as the image pickup portion 2, the display portion 8, and the like are put in a stand-by state.

Figure 11:
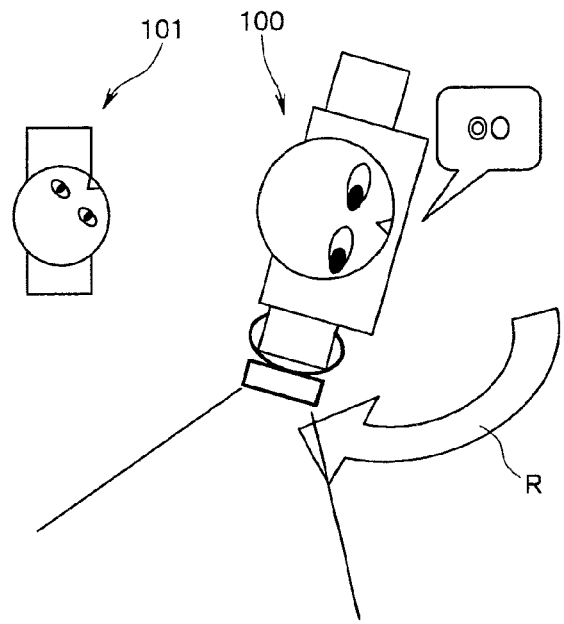
FIG. 11 is a diagram to illustrate the effects of the image pickup apparatus of FIG. 1 when it is used under a situation shown in FIG. 10.

In this case, since a specific behavior by the photographer 100 that can be determined by various sensors contained in the apparatus, for example the behavior of the photographer 100 talking to the object 101, turning around toward the object 101, or halting as shown in FIG. 11 is suitable for reflecting the intention of shooting and also can be detected by a microphone, an acceleration sensor, and an orientation sensor, the image pickup apparatus 1 may be provided with a processing sequence in which the image pickup apparatus 1 in a stand-by state immediately returns to a shooting-enabled state with the above described behavior as a trigger.

Figure 6:
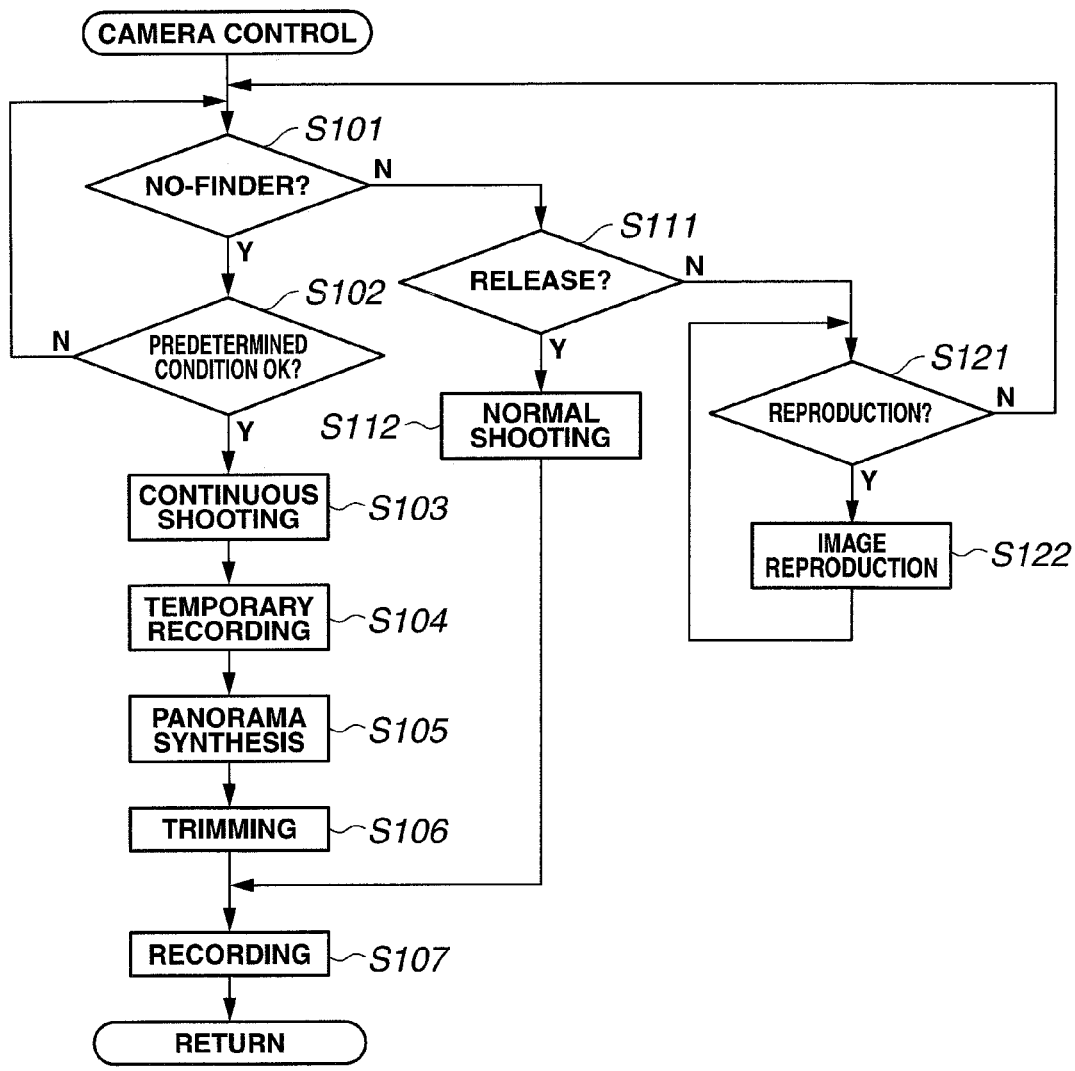
FIG. 6 is a flowchart showing an outline of the effects of camera control in the image pickup apparatus of FIG. 1.

When the image pickup apparatus 1 is under such situation, first, in step S101 of FIG. 6, the signal processing/control portion 11 monitors an output signal, etc. from the acceleration detection portion 6 to determine the posture state of the image pickup apparatus 1. Where, it is confirmed whether or not the state of the image pickup apparatus 1, such as of posture, is a no-finder state.

The no-finder state refers to a state in which the photographer 100 performs shooting without confirming the display screen of the display portion 8.

In an ordinary case, when performing a shooting by use of the image pickup apparatus 1, the photographer 100 determines a picture composition, etc. while observing the images continuously displayed on the display screen of the display portion 8 as a finder apparatus typically provided on the back surface side of the image pickup apparatus 1, with the image pickup apparatus 1 being held by hand (or being fixed to a fixture such as a tripod) and thereafter actuates a shutter release, etc.

However, when as described above, the image pickup apparatus 1 is fixedly held in a state as shown in FIGS. 9 and 10, etc., the photographer 100 cannot confirm the display screen of the display portion 8 of the image pickup apparatus 1. Therefore, it is not possible to perform a shooting with a proper framing and an intended picture composition by the display screen of the display portion 8, the photographer 100 can to some extent capture a desired object within a shooting angle of view without confirming the display screen by taking into consideration the optical axis direction of the image pickup apparatus 1, the shooting angle of view by the shooting lens, and the like. Shooting performed in this way by the photographer 100 without confirming the finder apparatus (display portion) is referred to as no-finder shooting, which is one of shooting methods that are conventionally widely practiced as a photo-shooting method.

However, since no-finder shooting performs a shooting operation without confirming a picture composition, resulting images thereof are not necessarily those images intended by the photographer.

Accordingly, the image pickup apparatus 1 of the present embodiment is configured such that a continuous shooting by no-finder shooting is performed to acquire a plurality of shot images; signal processing such as joining and synthesizing the acquired plural images into one image is performed; and further signal processing such as a trimming processing for cutting out a desired portion of the synthesized image, for example, a predetermined area with the image of the object 101 being at center is freely used, thereby generating a desired static image.

The determination on whether or not the image pickup apparatus 1 is in a no-finder state is performed based on the output signal from the acceleration detection portion 6, as described above.

Moreover, besides that, it may be configured to detect a state of the image pickup apparatus 1 by various detection means, such as for example by providing means for detecting a mounting state of the holding member 1a, providing means for detecting whether or not the photographer is present at a position to face the display portion 8, or providing means for detecting if the hand of the photographer is caught on a grip portion (a site on which the hand is caught when holding the image pickup apparatus 1 in a normal state), etc. of the image pickup apparatus 1.

Further, in place of those state detection means, a "no-finder mode" may be provided in the mode setting of shooting operation so that the mode in which the signal processing/control portion 11 is set in the above described processing of step S101 is confirmed.

It is noted that when inserting a processing sequence to cause the image pickup apparatus 1 to return from a stand-by state to a shooting-enabled state with behaviors as described above (see FIG. 11), etc. as a trigger, the above described processing of step S101 may be performed immediately after such a return processing.

When it is confirmed that the image pickup apparatus 1 is in a "no-finder state" in the above described processing of step S101, the process proceeds to the processing of next step S102. Then, in the processing after step S102, the signal processing/control portion 11 executes a processing sequence by an "automatic shooting mode".

In step S102, the signal processing/control portion 11 monitors the output signal from the acceleration detection portion 6, a voice signal acquired by the microphone 5, and the like to confirm whether or not a "predetermined condition" suitable for executing the "automatic shooting mode" is fulfilled. The details of the processing sequence of "predetermined condition" confirmation are as shown in FIG. 7.

Here, the details of the processing sequence to detect the "predetermined condition" for executing the processing sequence of the "automatic shooting mode" will be described according to the flowchart of FIG. 7.

Figure 7:
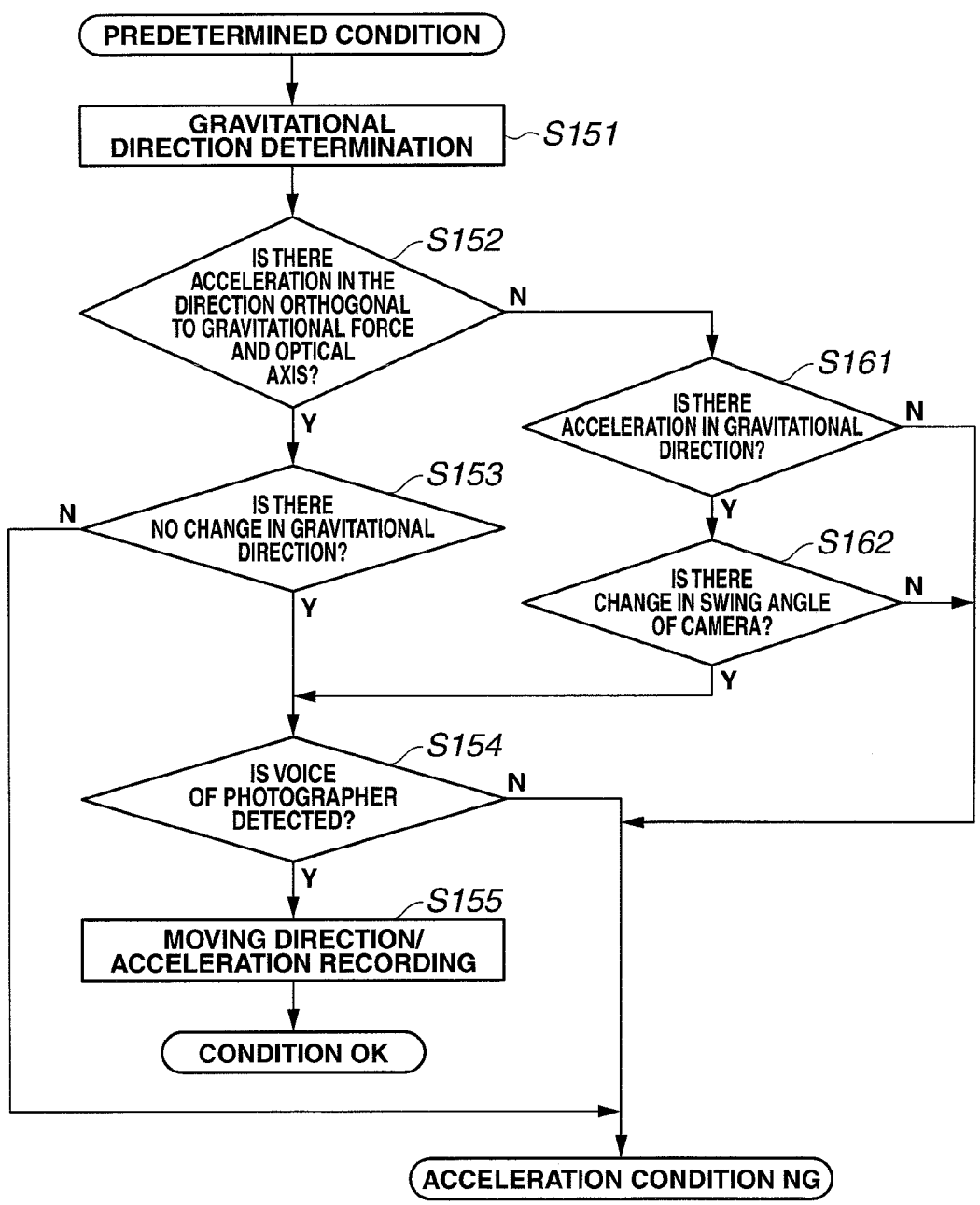
FIG. 7 is a flowchart showing details (sub-routines) of processing of a determined condition confirmation (processing of step S102) of the processing sequence of the camera control of FIG. 6.

First, in step S151 of FIG. 7, the signal processing/control portion 11 starts gravitational direction determination processing for determining the direction of the gravity applied to the image pickup apparatus 1 based on the output signal of the acceleration detection portion 6. Thereafter, the process proceeds to the processing of step S152.

Figure 12:
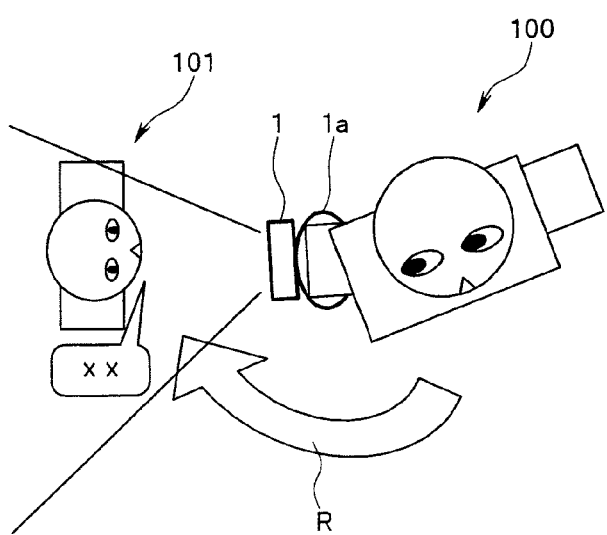
FIG. 12 is a diagram to illustrate the effects of the image pickup apparatus of FIG. 1 when it is used under a situation shown in FIG. 10.
Figure 15:
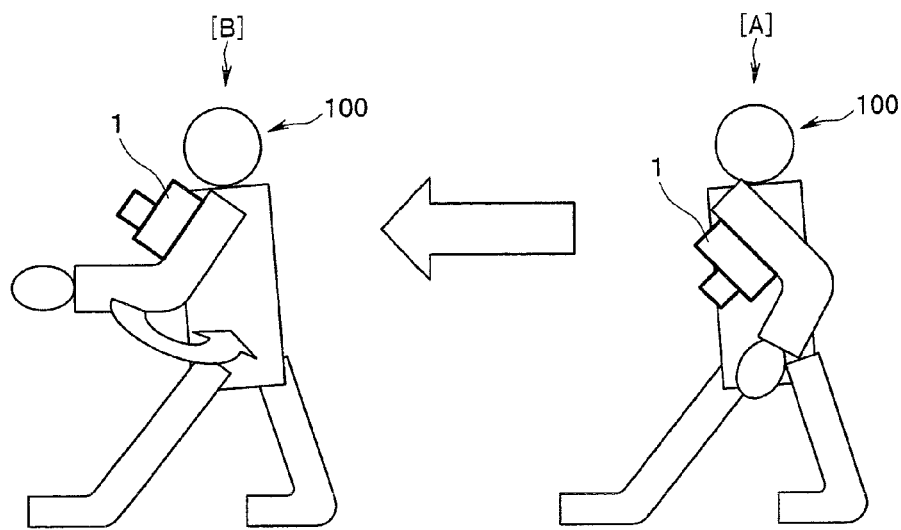
FIG. 15 is a diagram showing a different example of the concrete situation when the camera control by the image pickup apparatus of FIG. 1 is executed.
Figure 16:
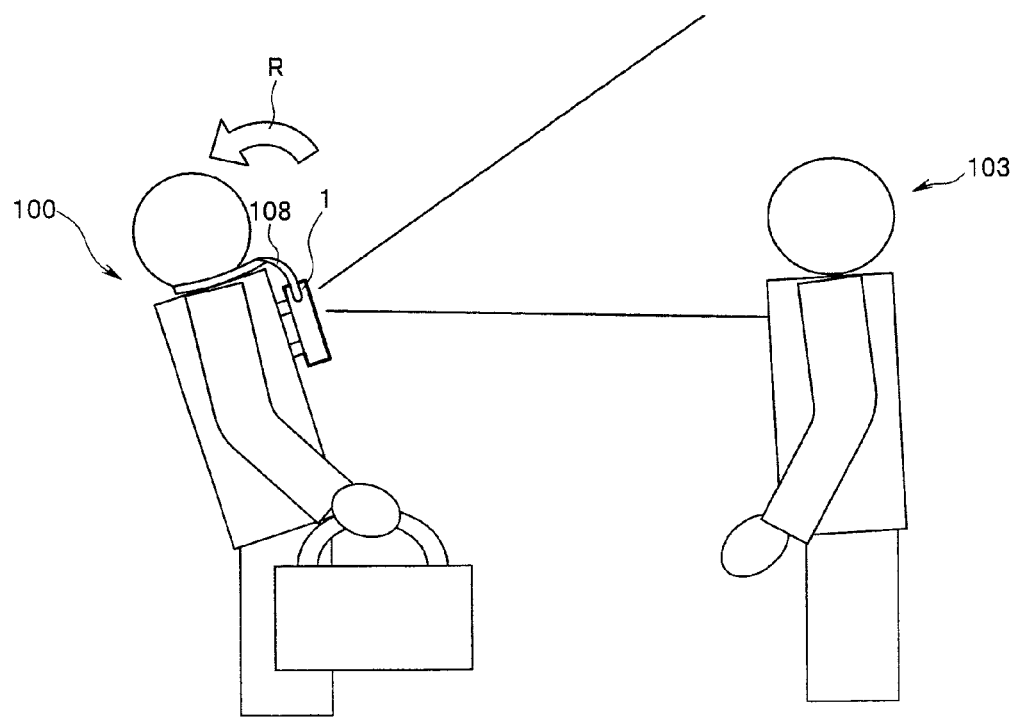
FIG. 16 is a diagram showing a further example of the concrete situation when the camera control by the image pickup apparatus of FIG. 1 is executed.

In step S152, in order to determine a turn around motion of a user as shown in FIGS. 11 and 12, an acceleration that is detected in the x direction (horizontal direction) of FIG. 3 is determined by using the acceleration sensors 6xa and 6xb of FIG. 3. When an acceleration detected by the acceleration sensor 6xa disposed at a position which is far from the human body and at which the radius during rotation is larger, is larger than an acceleration acquired by the acceleration sensor 6xb which is closer to the human body, the process is branched to Y. At this time, in order to determine the acceleration generated at the acceleration sensor 6xa, the signal processing/control portion 11 may compare the change in the acceleration in the gravitational direction (Y axis direction of FIG. 3) in the image pickup apparatus 1 based on the determination result by the above described processing of step S151. Here, when it is confirmed that an acceleration pattern specific to a turn around motion has occurred (that is, determined that the change of the acceleration sensor 6xa is larger than the acceleration change outputted by the acceleration sensors 6xb, 6y, and 6z, or an output as shown in FIG. 4 which has a peak of an about half of the gravity acceleration occurs), the process proceeds to the next step S153. Further, even when it is confirmed that no acceleration in the horizontal (X axis) direction has occurred, a motion as shown in FIG. 16 is assumed as a specific motion which can convey the intention of shooting, and when this is detected, the process proceeds to the processing of step S161. Moreover, when determining a camera angle suitable for shooting in a scene as shown in FIG. 15, the processing after step S161 is effective. These will be described later.

Next, in step S153, the signal processing/control portion 11 confirms the presence or absence of change in the gravitational (Y axis) direction based on the determination result in the above described processing of step S151. Where, when it is confirmed that there is no change in the gravitational (Y axis) direction, it is regarded that the photographer is at a standstill, and there is no up and down movement of camera, and the process proceeds to next step S154. This assumes a situation as in FIGS. 11 and 12.

Moreover, when a change in the gravitation direction is confirmed in the above described processing of step S153, it is determined that the user is not at a standstill, and therefore shaking may occur even if shooting is performed, and further that there is no intention of shooting, and thus the acceleration condition is not suitable (NG), and a series of processing sequences are ended.

Then, supposing that the "predetermined condition" is not fulfilled in the processing of step S102 of FIG. 6, the process returns to the processing of step S101 of FIG. 6 and repeats the processing thereafter to perform the detection of an object-specifying motion as described above.

Now, consider a case that under a situation as shown in FIG. 10, the photographer 100 turns around in the direction of arrow R shown in FIGS. 11 and 12.

If the situation of this moment is seen from over the head of the photographer 100, the image pickup apparatus 1 fixed on the arm of the photographer 100 will move along an arc in the direction of arrow R of FIGS. 11 and 12 with the body of the photographer being as the center of rotation. When the movement in this case occurs, an acceleration in the horizontal (X axis) direction is applied to the image pickup apparatus 1 while no change is observed in the gravitational (Y axis) direction. For such acceleration detection in the horizontal direction, the output of either of the acceleration sensors 6xa and 6xb of FIG. 3 may be utilized, and also the difference between those outputs may be utilized for detection as described above.

Figure 14:
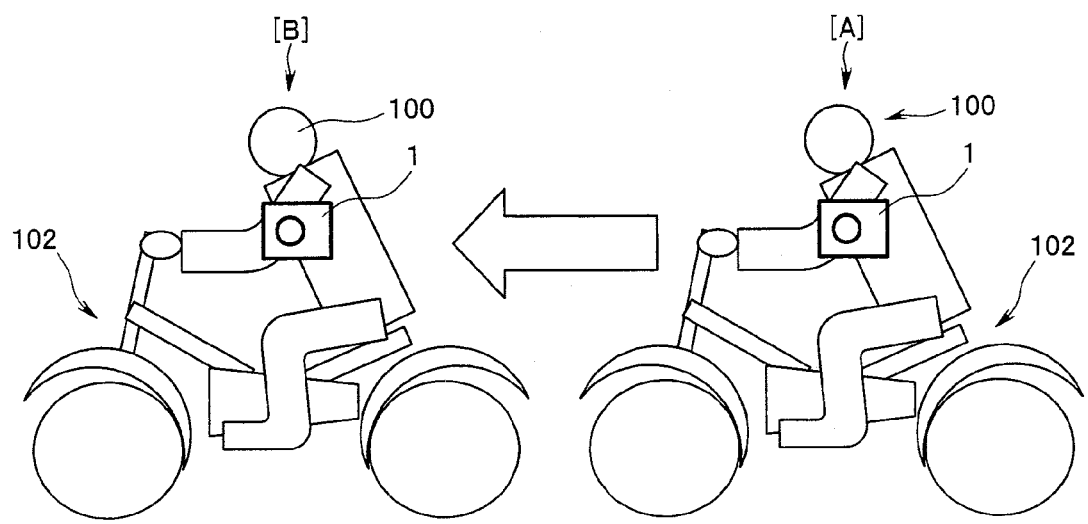
FIG. 14 is a diagram showing another example of the concrete situation when the camera control by the image pickup apparatus of FIG. 1 is executed.

Further, other than the situation shown in FIGS. 11 and 12, for example, a situation as shown in FIG. 14 is also conceivable as an example of the case in which the image pickup apparatus 1 moves in the horizontal (X axis) direction.

The situation shown in FIG. 14 shows that the photographer 100 who holds the image pickup apparatus 1 on the arm in the same manner as that of FIGS. 10 to 12 described above is moving on a vehicle such as a bicycle.

In this case, now consider a case in which the photographer 100 has moved from a point [A] to a point [B] shown in FIG. 14.

At this time, the image pickup apparatus 1 only moves in the horizontal (X axis) direction from the point [A] to the point [B]. Therefore, while an acceleration in the horizontal (X axis) direction is applied to the image pickup apparatus 1, there is no change observed in the gravitational (Y axis) direction. Such a case is considered to be a suitable scene for shooting as well, since the camera is kept in a posture suitable for obtaining images such as a panoramic photograph. That is, when the object to be shot is a landscape or a person, it is often the case that the optical axis of the camera lens is horizontal, and the left and right direction of the camera is also horizontal; the above described processing makes it possible to determine if such conditions are fulfilled.

Referring back to FIG. 7, in step S154, the signal processing/control portion 11 monitors a voice signal acquired by the microphone 5 to confirm whether or not the voice of the photographer 100 has been detected.

Here, as an item of the condition to start the "automatic shooting mode", not only the above described state change of the image pickup apparatus 1, but also a confirmation processing of the voice of the photographer by the detection of a voice signal is inserted. This can make the starting condition of the "automatic shooting mode" stricter thereby preventing misjudgment.

It is noted that the means for detecting the voice of the photographer 100 from a voice signal acquired by the microphone 5 can be achieved by, for example, preregistering the voice of the photographer in the recording portion 4, and comparing the signal based on the voice data with the voice signal acquired by the microphone 5.

When detection of a voice signal based on the voice of the photographer is confirmed in the above described processing of step S154, the process proceeds to the processing of next step S155. Moreover, when detection of a voice signal based on the voice of the photographer is not confirmed, it is determined that the acceleration condition is not suitable (NG), and a series of processing sequences are ended. Then, supposing that the "predetermined condition" is not fulfilled in the processing of step S102 of FIG. 6, the process returns to the processing of step S101 of FIG. 6 and repeats the processing thereafter.

Next, in step S155, the signal processing/control portion 11 records state information such as moving directions (moving patterns) of the image pickup apparatus 1, which is obtained based on the determination result by the above described processing of step S151, and accelerations in a temporary recording portion (not shown) or a recording medium of the recording portion 4. Thereafter, it is determined that the "predetermined condition" is in a suitable state, and a series of processing sequences are ended. Then, supposing that the "predetermined condition" is fulfilled in the processing of step S102 of FIG. 6, the process proceeds to the processing of step S103 of FIG. 6.

On the other hand, when an acceleration in the horizontal (X axis) direction is not confirmed in step S152 of FIG. 7, and the process proceeds to the processing of step S161, the signal processing/control portion 11 confirms, in this step S161, the presence or absence of an acceleration in the gravitational (Y axis) direction based on the determination result by the above described processing of step S151. Here, when it is confirmed that an acceleration in the gravitational (Y axis) direction has occurred, the process proceeds to the processing of step S162. Further, when it is confirmed that no acceleration in the gravitational (Y axis) direction has occurred, it is determined that the acceleration condition is not suitable (NG), and a series of processing sequences are ended. Then, supposing that the "predetermined condition" has not been fulfilled in the processing of step S102 of FIG. 6, the process returns to the processing of step S101 of FIG. 6 and repeats the processing thereafter. This allows the achievement of a camera which when a situation suitable for shooting is determined, will not miss the situation. A situation suitable for shooting is a situation in which the lateral direction of an image conforms to the horizon and the shooting optical axis is substantially horizontal so as to be suitable for shooting landscapes and people, and a condition that no camera shake has occurred is also included. At this time, the photograph composition will become similar to that when a photographer performs shooting with a camera in hand, and thus become natural. Further, it is advantageous that determining a joining position when joining images and setting a paste margin therefor will become easy when images are continuously obtained.

In the processing of step S162, the signal processing/control portion 11 confirms whether or not a change in a swing angle of the image pickup apparatus 1 has occurred based on the determination result by the above described processing of step S151. The swing angle refers to an angle formed between the X axis in the horizontal direction and the Z axis in the optical axis direction.

Here, conceivable situations in which a change in the swing angle of the image pickup apparatus 1 occurs include, for example, situations shown in FIGS. 15 and 16.

Among those, the situation shown in FIG. 15 shows a situation in which the photographer 100, who holds the image pickup apparatus 1 on the arm in the same manner as that of the above described FIGS. 10 to 12, is walking while swinging arms.

In this case, now consider a case in which the photographer 100 has moved from a point [A] to a point [B] shown in FIG. 15.

At this time, the image pickup apparatus 1 moves within a predetermined range along with the arm being swung as the photographer 100 walks. When the photographer 100 walks from the point [A] to the point [B], the swing angle of the image pickup apparatus 1, that is, the direction in which the optical axis (Z axis) is oriented changes. This change will result in a change of the output signal of the acceleration detection portion 6.

Moreover, the situation shown in FIG. 16 assumes a case in which the photographer 100 is facing a person 103, who is supposed to be an object, with the image pickup apparatus 1 being fixed to the front side of its own body, for example, on the chest by use of a holding member, etc., or with the image pickup apparatus 1 being hung from the neck by use of a strap 108.

Then, it is supposed that while the photographer 100 is in a state (not shown) of substantially facing up the person 103, the photographer 100 makes a behavior of bending backward in the direction shown by arrow R of FIG. 16. In this case, the optical axis (Z axis) of the image pickup apparatus 1 will turn upward associated with the behavior of the photographer 100. That is, the swing angle of the image pickup apparatus 1 (the direction in which the optical axis (Z axis) is oriented) changes.

The effects of the image pickup apparatus 1 in this case can be shown as in FIG. 17. That is, when the photographer 100 is facing up the person 103 under the situation of FIG. 16, the image pickup apparatus 1 comes into the state indicated by reference character 1 in FIG. 17. In this state, a force of magnitude F in the gravitational direction is acting on the image pickup apparatus 1.

When the photographer 100 makes a behavior of bending backward as described above from this state, the image pickup apparatus 1 changes its posture from the state indicated by reference character 1 in FIG. 17 to the state indicated by reference character 1A in the same figure. In association with this posture change (change of swing angle), a change will occur in the direction in which the force F in the gravitational direction acts on the image pickup apparatus 1. This change will result in a change in the output signal of the acceleration detection portion 6 as well.

With such a motion, the user can convey its intention of shooting to the camera even while not holding the camera by hand. Further, in the case of an image of person, since it is often desired to shoot an image with the face being positioned at center, directing the camera in the R direction enables a shooting with a picture composition similar to that of a hand-held shooting. In this case, since the gravitation acceleration can be accurately detected by determining the change from the up and down direction to the optical axis direction of the camera, there will be no misjudgment. Moreover, such a simple motion in either of lateral or longitudinal direction of the screen is advantageous in that image synthesis will become easier, and by bonding images, it becomes possible to obtain a rectangular image suitable for the display on an ordinary display panel.

Referring back to FIG. 7, when it is confirmed that a change has occurred in the swing angle of the image pickup apparatus 1 in the above described processing of step S162, the process proceeds to the above described processing of step S154, thereafter performing similar processing. Further, when no change in the swing angle of the image pickup apparatus 1 is confirmed, it is determined that the acceleration condition is not suitable (NG), and a series of processing sequences are ended. Then, supposing that the "predetermined condition" is not fulfilled in the processing of step S102 of FIG. 6, the process returns to the processing of step S101 of FIG. 6 and repeats the processing thereafter.

As so far described, when it is confirmed that the "predetermined condition" is not fulfilled in the above described processing of step S102 (FIG. 6) including the processing sequence of "predetermined condition" confirmation (FIG. 7), the process returns to the above described processing of step S101 and repeats the processing thereafter. On the other hand, when it is confirmed that the "predetermined condition" is fulfilled, the process proceeds to the processing of the next step S103.

Next, in step S103, the signal processing/control portion 11 executes a continuous shooting operation that continuously executes a plurality of shooting operations by controlling predetermined building blocks. The continuous shooting operation is an operation to continuously perform the acquisition operation of an ordinary static image.

For example, when the photographer 100 makes a behavior of turning around under the situation of FIGS. 10 and 11, the image pickup apparatus 1 will move while being rotated in the direction of arrow R of FIGS. 11 and 12. When a continuous shooting operation has been performed during the above described behavior, the plurality of shot images to be acquired by the continuous shooting operation will be, for example, as shown in FIG. 13.

Figure 13:
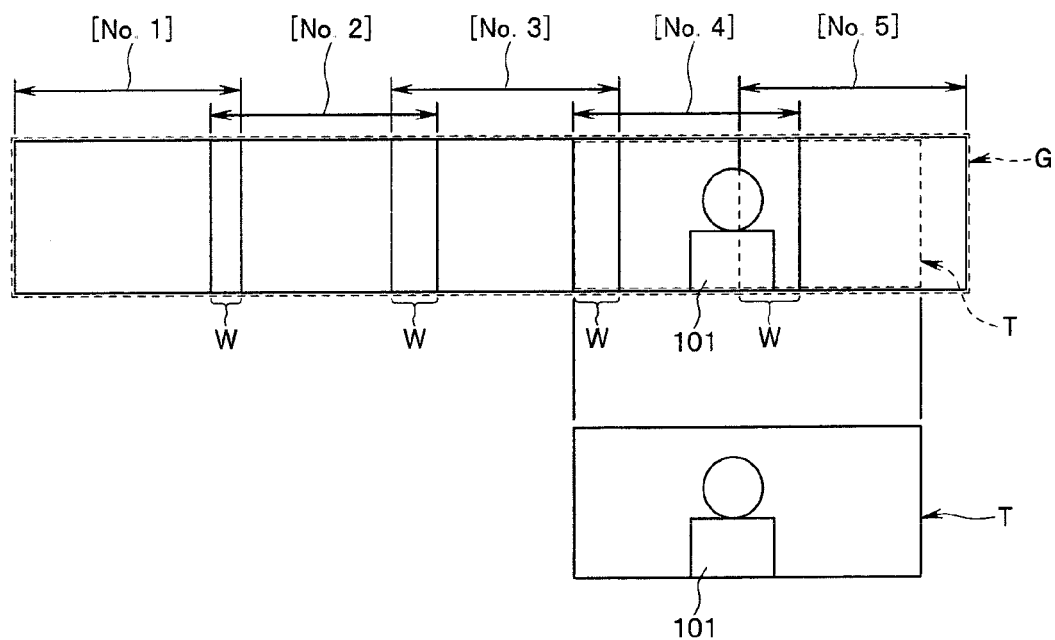
FIG. 13 is a diagram to illustrate a trimming processing to cut out a part of the image resulting from a synthesis processing performed based on plural images resulting from continuous shooting.

FIG. 13 shows the plurality of images, which are acquired by a series of continuous shooting operations, placed in order from the left. Here, reference characters [No. x] (x=1 to 5) shown in FIG. 13 represent the orders at which the images are shot. At this time, it is desirable that an overlapping area W exists in an end area of the long side direction (that is the moving direction of the image pickup apparatus 1) of each shot image. In the present invention, it is configured that this overlapping area W is utilized to perform an image synthesis processing to be described later.

However, depending on the situations of the posture change and movement of the image pickup apparatus 1 when a continuous shooting is performed, there may be, for example, a case in which the overlapping area W has become larger compared with one shootable area of image as shown in FIG. 18A, or a case in which no area that overlaps a prior and subsequent images in succession is obtained as shown in FIG. 18C. When the overlapping area W is large as in FIG. 18A, the burden for performing image synthesis processing will increase for the reasons that necessary number of images increases, and like. Moreover, when no overlapping area is obtained as in FIG. 18C, it becomes impossible to perform image synthesis processing.

Figure 19:
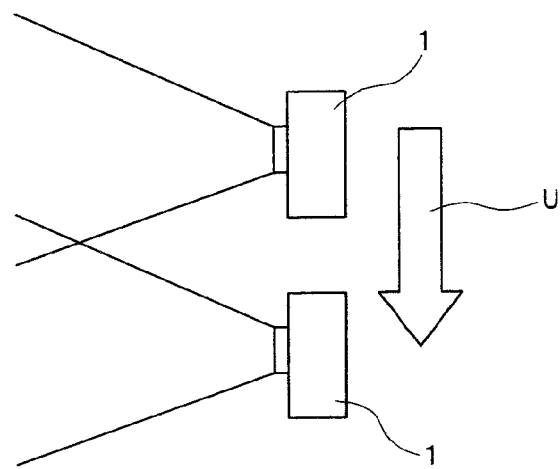
FIG. 19 is a diagram showing a moving situation of the image pickup apparatus under the use situation of FIG. 14.
Figure 20:
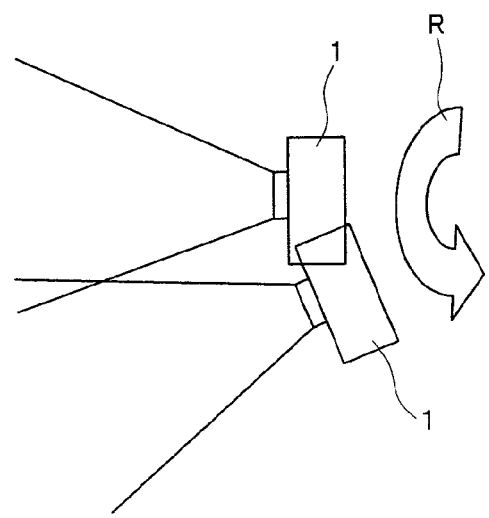
FIG. 20 is a diagram showing a moving situation of the image pickup apparatus under the use situations of FIG. 11 and FIG. 12 or FIG. 15 and FIG. 16.

Conceivable posture changes and moving situations of the image pickup apparatus 1 include, for example, a case in which the image pickup apparatus 1 moves straight at a high speed as with the example shown by FIG. 14 (to be brief, as shown in FIG. 19; reference character U represents the straight movement direction), and a case in which the image pickup apparatus 1 moves with rotation when it moves in the horizontal or vertical direction as with the example shown in FIGS. 11 and 12, or FIGS. 15 and 16 (to be brief, as shown in FIG. 20; reference character R represents the rotational direction), and the former and the latter differ in the moving speed of the image pickup apparatus 1 itself.

Therefore, in order to perform rapid and accurate image synthesis processing, it is necessary that a plurality of images obtained by a continuous shooting operation are appropriately arranged. For that purpose, it is desirable that the number of images acquired by a continuous shooting operation is as little as possible, and that even when an overlapping area W is obtained as shown in FIG. 18B, the overlapping area W has a small area.

In order for achieving this, it is configured in the processing sequence of the continuous shooting operation in the present embodiment that the continuous shooting speed is controlled according to the posture change and moving situation of the image pickup apparatus 1.

Next, details of the above described processing sequence of continuous shooting operation of step S103 will be described by using the flowchart of FIG. 8.

Figure 8:
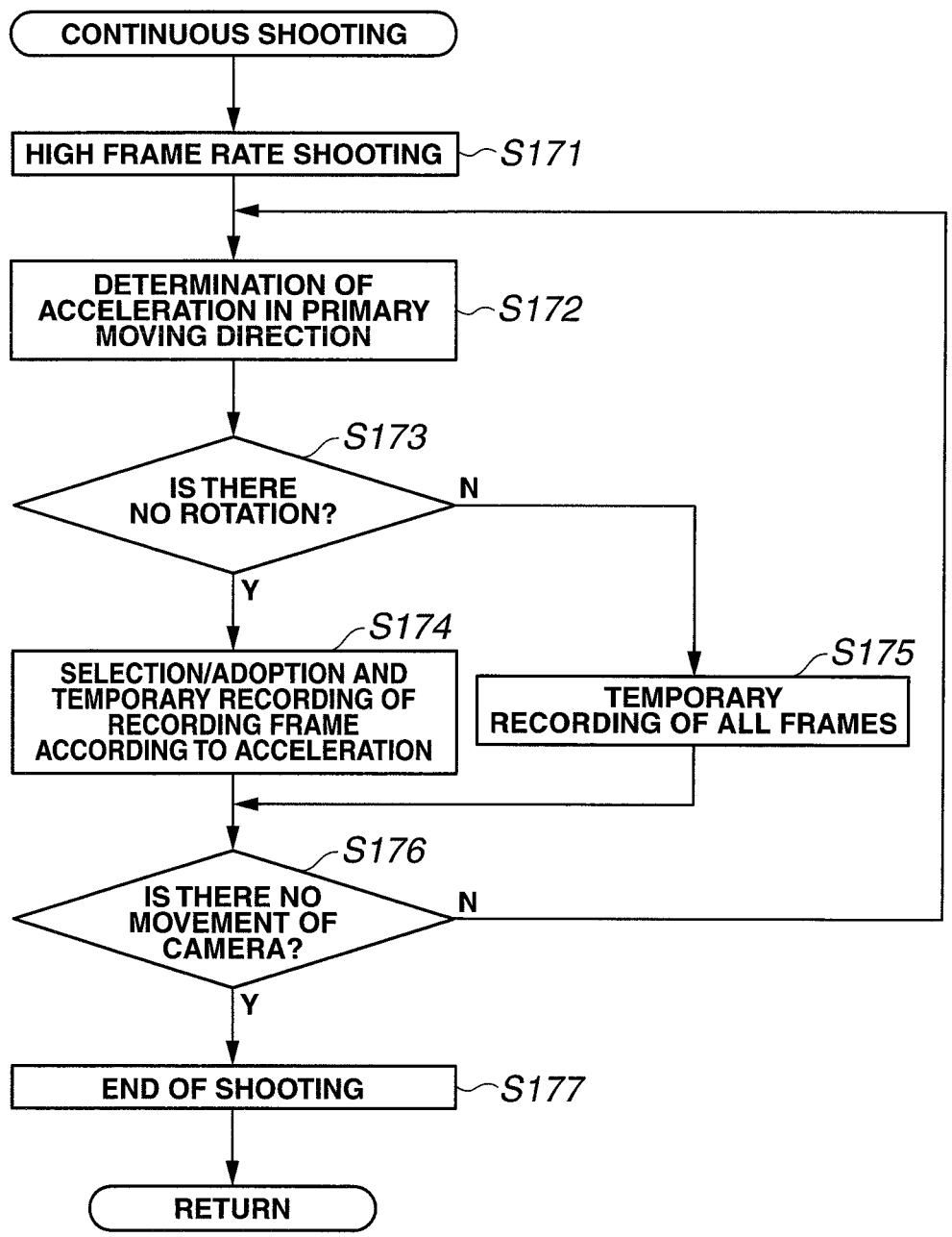
FIG. 8 is a flowchart showing details (sub-routines) of continuous shooting processing (processing of step S103) of the processing sequence of the camera control of FIG. 6.

When a continuous shooting operation is executed by the above described procedure in the processing of step S103 of FIG. 6, first, in step S171 of a subroutine of FIG. 8, the signal processing/control portion 11 executes a "high frame rate shooting" processing in which a shooting operation to be performed continuously (hereafter, referred to as continuous shooting) is executed as fast as possible.

Next, in step S172, the signal processing/control portion 11 performs the processing to determine the acceleration in the primary moving direction based on situation information temporarily recorded in the above described processing of step S155 of FIG. 7.

Then, in step S173, the signal processing/control portion 11 confirms whether or not the posture change and moving situation of the image pickup apparatus 1 involves rotation (angular change) based on the determination result in the above described processing of step S172. Where, when it is confirmed that rotation is not involved, the process proceeds to the processing of next step S174.

Here, examples of the moving situation that does not involve rotation are the above described movements as shown in FIGS. 14 and 19. Since there is little change in the image in such cases, it is likely that adjoining images within a plurality of images that are continuously shot have a larger overlapping area W as with the example shown in FIG. 18A.

Therefore, in the processing of next step S174, the signal processing/control portion 11 performs a selection and adoption processing of a recorded frame according to acceleration information based on the above described determination result of the processing of step S172, and thereafter performs processing for causing only selected images to be temporarily recorded in a first temporary recording portion 4a. It is noted that the actual recording processing is performed after the end of a series of continuous shooting processing (see step S104 of FIG. 6 to be described later).

Examples of the selection and adoption processing of recorded frame performed here include, for example, a processing in which every other frames is selected from a series of plurality of images which are continuously shot when the acceleration is large, and one in every three frames is selected when the acceleration is small. Thereafter, the process proceeds to the processing of step S176.

On the other hand, when it is confirmed that rotation is involved in the above described processing of step S173, the process proceeds to the processing of step S175.

Here, a moving situation involving rotation refers, for example, to the movements which are briefly shown in the above described FIGS. 11 and 12, and FIGS. 15 and 16. In such cases, since the change of image is large, it is likely that adjoining images within a plurality of images that are continuously shot have a smaller overlapping area W as with the example shown in FIG. 18B.

Therefore, in the processing of step S175, the signal processing/control portion 11 performs a processing for causing all of the plurality of images obtained by continuous shooting to be temporarily recorded in the first temporary recording portion 4a. It is noted that the actual recording processing is performed after the end of a series of continuous shooting processing (see step S104 of FIG. 6 to be described later). Thereafter, the process proceeds to the processing of step S176.

In step S176, the signal processing/control portion 11 monitors the output signal of the acceleration detection portion 6 to confirm whether or not the moving situation of the image pickup apparatus 1 substantially comes to a standstill. Where, when it is confirmed that the image pickup apparatus 1 is still moving and not at a standstill, the process returns to the above described processing of step S172 and repeats processing thereafter. Moreover, when it is confirmed that the image pickup apparatus 1 has stopped moving, the process proceeds to the processing of next step S177.

In step S177, the signal processing/control portion 11 executes processing to end the shooting operation, and thereafter ends a series of processing, returning to original processing (RETURN).

Referring back to FIG. 6, when the subroutine of FIG. 8, that is, the processing of step S103 ends in a manner as described above, the process proceeds to the processing of next step S104.

In step S104, the signal processing/control portion 11 temporarily records plural image signals which are acquired by the above described processing of step S103 and are supposed to be recorded, in the first temporary recording portion 4a. Thereafter, the process proceeds to the processing of step S105.

In step S105, the image-signal manipulation processing portion 11d of the signal processing/control portion 11 executes a panorama synthesis processing for joining the plural image signals which are temporarily recorded in the first temporary recording portion 4a (an image joining processing) and temporarily records the resulting synthesized image signal in the second temporary recording portion 4b. Thereafter, the process proceeds to the processing of step S106.

Here, the panorama synthesis processing (image joining processing) to be executed by the image-signal manipulation processing portion 11d will be a processing as follows.

For example, supposing that a series of plural images of [No. 1] to [No. 5] shown in FIG. 13 have been acquired, the panorama synthesis processing is image synthesis processing for joining each overlapping area W of the plural images in alignment with each other. The panorama synthesized image generated by this processing has a shape which is longer in the lateral direction as shown by reference character G of FIG. 13.

Next, in step S106, a trimming portion 11e of the signal processing/control portion 11 executes trimming processing to cut out an image of a predetermined area having a primary object at its center based on the synthesized image signal that is temporarily recorded in the second temporary recording portion 4b. Thereafter, the process proceeds to the processing of step S107.

Here, the trimming processing executed by the trimming portion 11e is the processing as follows.

For example, suppose that a desired image of the primary object 101 is shot in [No. 4] and [No. 5] of the panorama synthesized image G generated from a plurality of (five in the example of FIG. 13) images acquired by continuous shooting as shown in FIG. 13.

The trimming processing is a processing to cut out a predetermined area T such that the primary object 101 of the panorama synthesized image G is located substantially at the center of the screen. The trimmed image generated by this processing is an image shown by reference character T in FIG. 13.

It is noted that the means for detecting the primary object 101 from within the panorama synthesized image G when performing the above described trimming processing can be achieved by preregistering a face image of the object 101 and utilizing the face detection portion 3 based on the registered information.

Next, in step S107 of FIG. 6, the signal processing/control portion 11 records a trimmed image signal generated by the above described processing of step S106, after applying predetermined processing thereto, in a recording medium of the recording portion 4. Thereafter, the process ends a series of processing (RETURN).

It is noted that in the processing of step S107, the image data to be recorded in the recording medium of the recording portion 4 may include not only synthesized image signals after trimming processing, but also a plurality of image signals which are acquired by a series of continuous shooting operation and temporarily recorded in the first temporary recording portion 4a, panorama synthesized images which are temporarily recorded in the second temporary recording portion 4b, and so on.

The processing sequence during the "automatic shooting mode" of the "camera control" (FIG. 6) by the image pickup apparatus 1 of the present embodiment is as so far described.

On the other hand, in the above described processing of step S101, when it is confirmed that the image pickup apparatus 1 is not in a "no-finder state", the process proceeds to the processing of step S111. Then, after this step S111, the signal processing/control portion 11 executes processing sequence by a normal operation mode.

First, in step S111, the signal processing/control portion 11 monitors the output signal from the actuation portion 7 to confirm whether or not a shutter release signal that instructs the start of a shooting operation has occurred. This confirmation is a confirmation of whether or not a predetermined actuation to instruct a shooting operation, that is, actuation of the shutter release button, etc. is performed by the photographer 100. Here, when a shutter release signal is confirmed, the process proceeds to the processing of next step S112.

In step S112, normal shooting processing as generally practiced in conventional image pickup apparatus is executed. Thereafter, the process proceeds to the processing of step S107.

Moreover, in the above described processing of step S111, the signal processing/control portion 11 proceeds to the processing of step S121 when a release signal is confirmed.

In step S121, the signal processing/control portion 11 monitors the output signal from the actuation portion 7 to confirm whether or not an instruction signal to switch to a reproduction mode has occurred. Here, when it is confirmed that the operation mode is set to the reproduction mode by a switching signal to the reproduction mode, the process proceeds to the processing of next step S122. Moreover, when a switching signal to the reproduction mode is not confirmed, the process returns to the above described processing of step S101 and repeats the processing thereafter.

In step S122, the signal processing/control portion 11 controls a predetermined building block to execute an image reproduction processing. Thereafter, the process returns to the above described processing of step S121 and repeats the processing thereafter.

It is also conceivable that in the above described embodiment, a voice signal from the object acquired by the microphone 5 is utilized when performing a panorama synthesis processing, a trimming processing, and the like.

Figure 21:
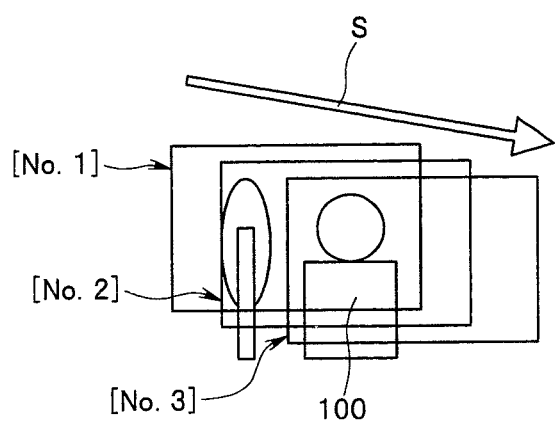
FIG. 21 is a diagram showing another example of the shooting result during a continuous shooting operation by the image pickup apparatus of FIG. 1.

For example, consider a case as shown in FIG. 21 as an example of the plurality of images acquired by performing a continuous shooting operation.

In FIG. 21, arrow S indicates a moving direction when the image pickup apparatus 1 performs a continuous shooting while moving. In the example shown in FIG. 21, it is supposed that three images [No. 1], [No. 2], and [No. 3] are acquired and the image of primary object 101 is captured in each of the shot frames.

Where, when a panorama synthesis processing is executed based on the three images [No. 1], [No. 2], and [No. 3], as the condition to select the image of the primary object 101 from which of the three images, the image which is shot at the timing when the object 101 makes a reply is preferentially selected.

For example, consider a case in which the photographer 100 performs a behavior to speak to and turns around to face the object 101 as shown in FIG. 11.

At this time, suppose that for example, the image pickup apparatus 1 is activated, and a continuous shooting operation is started. Therefore, the continuous shooting operation starts from the time point when the voice of the photographer 100 is generated, and the continuous shooting continues during the behavior that the photographer turns around. Then, if the object 101 makes a reply during that time, that sound generation timing is recorded. This information of sound generation timing is appropriately referred when signal processing such as panorama synthesis processing is performed.

Here, FIG. 22A shows individual images obtained by breaking down the image resulting from the continuous shooting shown in FIG. 21. Here, suppose the image which is shot at a substantially same timing as the timing at which the object 101 generated sound is the image indicated by reference character [No. 3].

In this case, when a panorama image processing is executed, the image [No. 3] is preferentially selected as the image including the primary object 101, and then, the image [No. 2] adjoining thereto is selected. Then, a panorama synthesis processing with the image [No. 2] is performed as shown in FIG. 22B such that the portion of the object 101 of the image [No. 3] is placed at the front end.

Figure 22:
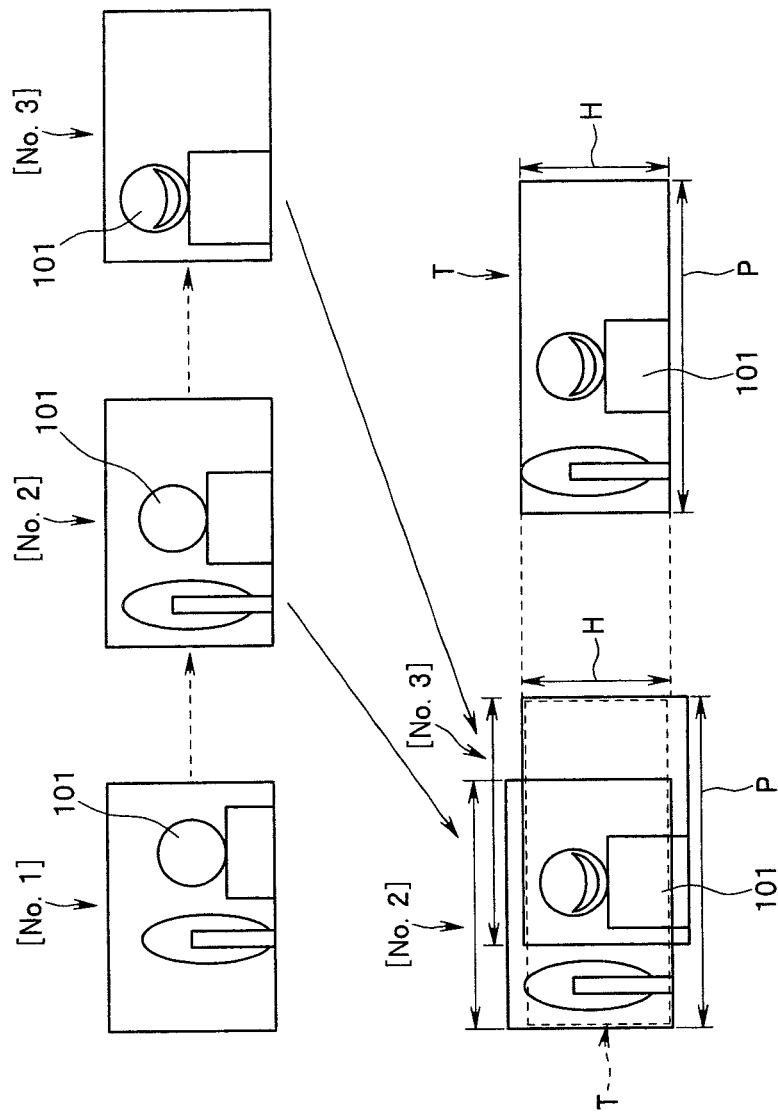

In the example of FIGS. 21 and 22, since the image pickup apparatus 1 is moving in a slightly inclined direction as indicated by an arrow S of FIG. 21, a trimming in the height direction of the processed panorama synthesized image becomes necessary to generate an image of a rectangular shape.

Accordingly, a trimming processing to cut off the portion of area T is performed as shown FIG. 22B, and the resulting generated image is as shown by reference character T (a rectangular image indicated by width P by height H).

In this way, by utilizing a voice signal that can be acquired by the microphone 5 at the time of image manipulation processing, it is made possible to perform image recording around the instant when communication is made between the photographer 100 and the object 101.

As so far described, according to the above described first embodiment, the image pickup apparatus 1 determines the behavior, etc. of the photographer 100 who holds the image pickup apparatus 1 in a no-finder state, based on the output signal of the acceleration detection portion 6, and when a predetermined condition is met, a continuous shooting operation is executed thereby acquiring a continuous series of plural images. Then, panorama synthesis processing to join those plural images is performed, and further, the generated panorama synthesized image is subjected to a trimming processing to cut out an area of a predetermined range in which a desired object is positioned substantially at the center, and finally one generated static image is recorded.

Since it is configured that such a series of processing is automatically executed, the photographer can easily acquire a static image, which securely includes a desired object, by performing a predetermined behavior in a so-called no-finder state without becoming conscious about a picture composition while holding an image pickup apparatus by hand, and without the need of performing the actuation for shooting.

The above described first embodiment is configured such that even in a state in which the photographer does not hold the image pickup apparatus by hand, when a photographer performs a predetermined behavior with its intention, continuous shooting is performed with that behavior being as a trigger (starting point) of shooting operation, and signal processing (image synthesis processing such as, for example, a panorama synthesis processing, an image joining processing, a trimming processing, etc.) is performed on the acquired plural shot images, acquiring an appropriate static image of desire in the end; and thus provides an image pickup apparatus that automatically performs such a series of shooting processing sequence.

Second Embodiment

When an image pickup apparatus is used, such a situation in which the photographer wants to perform shooting while he or she does not hold the image pickup apparatus by hand is conceivable not only in the examples shown in the above described first embodiment, but also in various other circumstances.

Next, in a second embodiment to be described, a plurality of situations different from the shooting situations shown in the above described first embodiment are assumed, and another form of image pickup apparatus that corresponds to each of those situations will be described.

The image pickup apparatus of the second embodiment of the present invention is an image pickup apparatus such as a digital camera, etc. as with the above described first embodiment. The image pickup apparatus of the present embodiment comprises an image pickup portion, converts an object image into image data with the image pickup portion, and performs a live view display of an image based on the image data on a display portion disposed on the back surface of the main body of the image pickup device. When performing a normal shooting in the present image pickup apparatus, the photographer decides a picture composition and a shutter chance by observing the live view display.

Further, in the image pickup apparatus of the present embodiment, when performing a no-finder shooting, it is configured that a release operation is executed with a bending backward motion of the photographer as a trigger. When a release operation is executed in this way, image data acquired by the image pickup portion is recorded in a recording medium after being subjected to a predetermined signal processing (image processing, compression processing, etc.).

When this recoding operation is performed, various pieces of appended information such as a shooting date, and a shooting mode is recorded as in the case of an ordinary image pickup apparatus. Moreover, it is possible to cause the shot image data recorded in the recording medium to be reproduced and displayed on the display portion by switching the operation mode of the image pickup apparatus into a reproduction mode.

The basic configuration of the image pickup apparatus of the present embodiment is made up of substantially the same configuration of the above described image pickup apparatus of the first embodiment. Therefore, for the same components as those of the above described first embodiment, description and illustration thereof will be omitted, and only different components will be described below with reference to FIG. 1 used in the above described first embodiment.

A signal processing/control portion 11 in an image pickup apparatus 1 of the present embodiment is configured to contain an image-signal manipulation processing portion 11*d*, a trimming portion 11*e*, etc. as with the above described first embodiment.

The image-signal manipulation processing portion 11*d* in the present embodiment performs, for example, inclination correction processing on the image data cut out by the trimming portion 11*e*, in addition to the above described image synthesis processing. Moreover, the image-signal manipulation processing portion 11*d* performs inclination correction processing of the image for display, which is to be displayed on a display portion 8, depending on the posture of the image pickup apparatus 1 when an image is reproduced and displayed. Such image inclination correction processing is processing performed by the acceleration detection portion 6 based on a detected inclination value.

Further, the image-signal manipulation processing portion 11*d* performs various kinds of image processing, such as an image processing which, when a below described thumbnail image, which is a circular image, is displayed on the display portion 8, causes each circular image to be rotated and displayed such that each circular image on the screen is aligned in a predetermined form according to the instruction of the photographer (specifically, such that the vertical axis of each image is radially aligned from the screen center of the display portion 8 toward the outside).

Image processing performed by the image-signal manipulation processing portion 11*d*, such as the above described image inclination correction processing will be described below in detail.

On the other hand, the trimming portion 11*e* is a processing circuit that performs image processing (trimming processing) to cut out a portion of image data as described above. The trimming processing by the trimming portion 11*e* is a processing to cut out an image into a predetermined shape based on the image data which is temporarily stored in a first temporary recording portion 4*a* and a second temporary recording portion 4*b*. The cut-out shape at this time is not limited to a rectangular shape, but may be circular shape, etc. As described later, in the present embodiment, processing to cut out a circular image from image data is performed when no-finder shooting is performed. It is noted that the image data resulting from the trimming processing is temporarily stored in the first temporary recording portion 4*a* and the second temporary recording portion 4*b*.

The image pickup apparatus 1 of the present embodiment has a no-finder shooting mode as one kind of the shooting operation mode. Therefore, the present image pickup apparatus 1 is adapted to detect the situation of the image pickup apparatus 1 as described above, and automatically sets the shooting operation mode to the no-finder shooting mode when the image pickup apparatus 1 is in a predetermined situation.

As the means of detecting situations when automatically setting the no-finder shooting operation mode, it is conceivable to detect the posture situation of the image pickup apparatus 1 with, for example, the above described acceleration detection portion 6. To be specific, for example, when the image pickup apparatus 1 is in a state of being hung from the neck with a neck strap, etc., it may be configured to detect whether or not a force in the opposite direction to the gravitational force is acting on the site where an attachment portion of the neck strap, etc. is disposed. Moreover, it may also be configured to detect that the image pickup apparatus 1 is not held up at a normal fixed position such as a longitudinal position and a lateral position, etc. Further, besides that, it may also be configured to detect a situation such as that substantially the entire surface of the display screen of the display portion 8 is covered, based on the output of the output of a touch panel 8*b* as described above.

In addition, it may be configured to separately provide a holding state detection switch for detecting the states of the image pickup apparatus 1 being held by fingers of the photographer, etc., being fixed to a tripod, or being placed on a desk, etc. so that automatic setting may be performed according to the presence or absence of an output signal from the holding detection switch.

Figure 23:
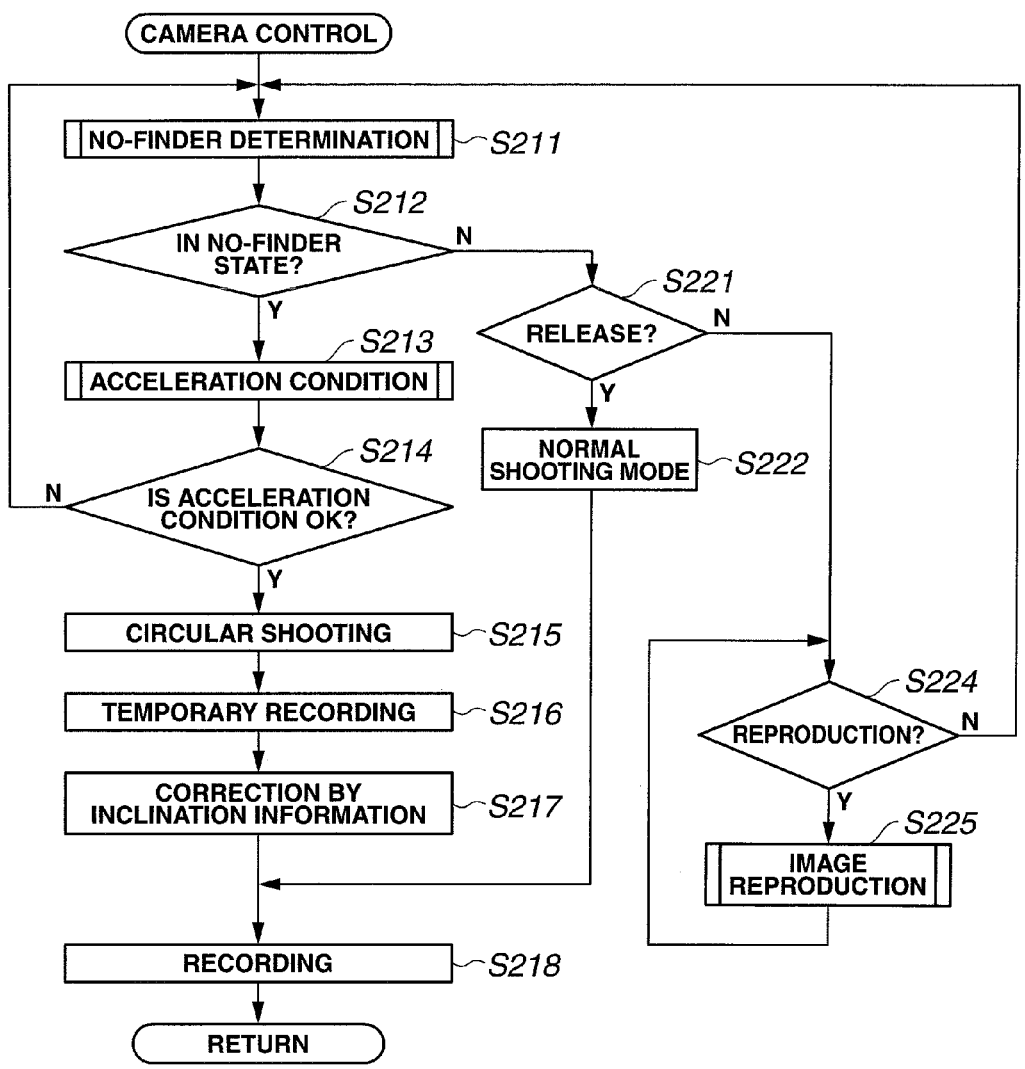
FIG. 23 is a flowchart showing the operation of camera control of an image pickup apparatus of a second embodiment of the present invention.

These detection means will be described in detail in a no-finder determination processing (see the subroutine of FIG. 24) which is the processing of step S11 shown in FIG. 23 to be described later.

Further, aside from such automatic setting, the present image pickup apparatus 1 allows the photographer to directly set an operation mode manually, or to perform a manual setting to cancel the setting by using a menu screen, which is called and displayed by a menu button, etc. included in the actuation portion 7, and a predetermined instruction actuation member or a touch panel 8*b*, etc. Allowing such manual setting is useful, for example, when it is desired to maintain the set condition of the no-finder mode for a fixed time period. That is because, when it is desired to maintain a desired operation mode for a predetermined time period, manually performing the setting of operation mode will eliminate the risk of detection errors such as that the operation mode setting is inadvertently switched depending on situations due to the automatic setting.

On the other hand, the image pickup apparatus 1 may be configured to be dedicated to the no-finder shooting. In that case, the setting as the no-finder shooting mode is a standard setting, and means (a setting actuation member, and a control program therefor, etc.) for switching to other shooting operation modes can be omitted.

Other configurations are exactly the same as those of the above described first embodiment.

The effects when performing shooting by use of the thus configured image pickup apparatus 1 of the second embodiment of the present invention will be described below by using the flow charts of FIGS. 23 to 26, and FIGS. 27 to 38, etc.

First, general use situations when a processing sequence relating to "camera control" by the image pickup apparatus 1 is executed will be briefly described by using FIGS. 27 to 33.

In the present embodiment, a situation where a no-finder shooting is performed with the image pickup apparatus 1 being hung from the neck of the photographer is assumed.

Figure 27:
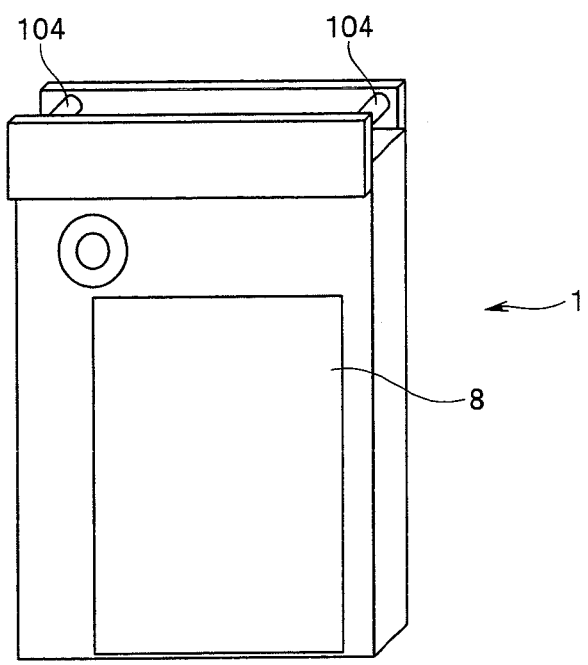
FIG. 27 is a schematic external view of the image pickup device of the second embodiment of the present invention.

As shown in FIG. 27, the image pickup apparatus 1 of the present embodiment is provided with strap pins 104 for drawing the strap 108 at predetermined two locations on one side surface of the apparatus main body.

There are various situations in which the image pickup apparatus 1 is carried by use of the strap 108. FIG. 28 shows the manners in which the photographer 100 hangs the image pickup apparatus 1 from the neck by use of the strap. For example, FIG. 28A shows a case in which the image pickup apparatus 1 is hung from the neck of the photographer 100 with the strap 108 being drawn through the strap pins 104 at two locations. At this time, the direction orthogonal to the longitudinal direction of the display screen of the display portion 8 of the image pickup apparatus 1 is approximately the direction of the horizon.

Moreover, FIG. 28B shows the case in which the image pickup apparatus 1 is hung from the neck of the photographer 100 with strap 108 being drawn through the strap pin 104 at one location. In this case, it is almost difficult to arrange that the longitudinal direction of the screen of the image pickup apparatus 1 is aligned with the horizon or the vertical line.

Further, FIG. 28C shows the case in which the image pickup apparatus 1 along with a bag 112 is hooked on the arm of the photographer 100. In this case as well, as with case of FIG. 28B, it is almost difficult to arrange that the longitudinal direction of the screen of the image pickup apparatus 1 is aligned with the horizon or the vertical line. Thus, when the photographer 100 holds the image pickup apparatus 1 by use of the strap 108 without directly holding it by hand, it is difficult for the photographer 100 to confine the live view display to be displayed on the display portion 8. Moreover, it is difficult to predict the inclination of the screen of the image pickup apparatus during shooting.

Figure 29:
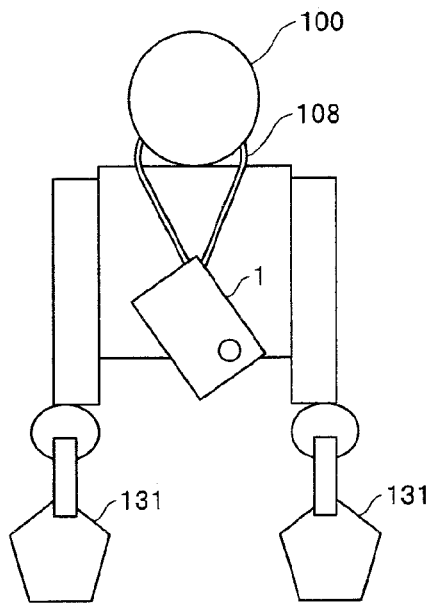
FIG. 29 is a diagram shown a manner in which the photographer hangs an image pickup apparatus from the neck when performing a no-finder shooting, in the image pickup device of the second embodiment of the present invention.

FIG. 29 shows the manner in which the photographer 100 performs a no-finder shooting without directly holding image pickup apparatus 1 by hand. In the state shown in the figure, the photographer 100 hangs the image pickup apparatus 1 from the neck via the strap 108, and holds baggage 131 with both hands. The situation is like when going out for mountain climbing or travelling with many pieces of baggage. Therefore, the photographer 100 cannot confirm the live view display to be displayed on the display portion 8. Moreover, both hands are occupied by the baggage 131, it is not possible to actuate the release button.

Figure 30:
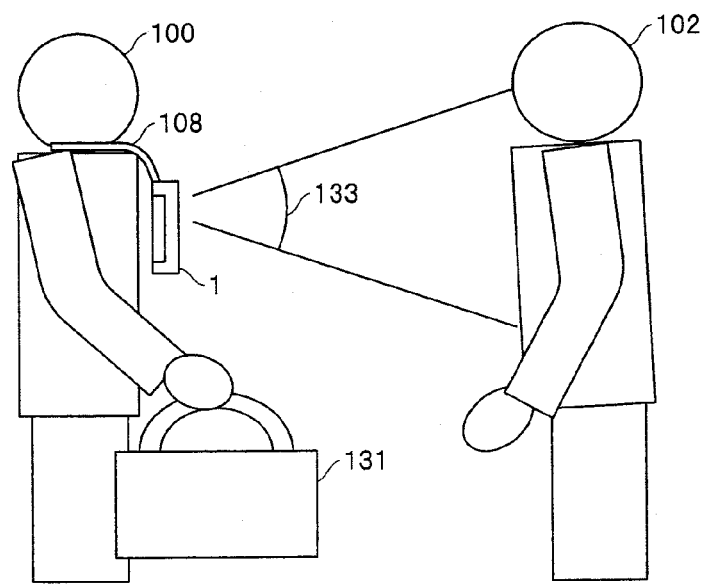
FIG. 30 is a diagram showing a shooting range under a state in which the image pickup apparatus is hung from the neck when performing a no-finder shooting, in the image pickup device of the second embodiment of the present invention.

In the situation as shown in FIG. 29, since the image pickup apparatus 1 is hung from the neck of the photographer 100, the shooting range 133 of the image pickup apparatus 1 will be the range as shown in FIG. 30. If a no-finder shooting is performed for the object 102 which is a person, a part of the face of the object 102 will not be included in the shooting range, and therefore it is not possible to perform a desired shooting. Therefore, in order for that the photographer 100 performs shooting such that the face portion of the object 102 is included in the screen, the photographer 100 can for example bend himself/herself backward so that the shooting range 133 of the image pickup apparatus 1 is directed upward (see the state shown in FIG. 16).

As a result of the photographer 100 bending himself/herself backward, the image pickup apparatus 1 is subjected to an acceleration in an upward direction. That is, before bending backward, a gravitational force F of a downward direction (−X direction) is applied to the image pickup apparatus 1 as shown in the posture of reference character 1 of FIG. 17. When the photographer bends himself/herself backward from this state, the image pickup apparatus 1 becomes inclined and is subjected to a gravitational force F in the direction that is resolved into −X direction and −Z direction. Moreover, since the image pickup apparatus 1 is pulled upwardly, a large acceleration opposing the gravitational force occurs. In the present embodiment, change of the direction of the gravitational force F is detected by the acceleration detection portion 6, and when the behavior of bending backward is performed, a release operation is executed with the behavior being as a trigger.

The sensing signal of the acceleration detection portion 6 in such case will be described by using FIG. 31.

Figure 31:
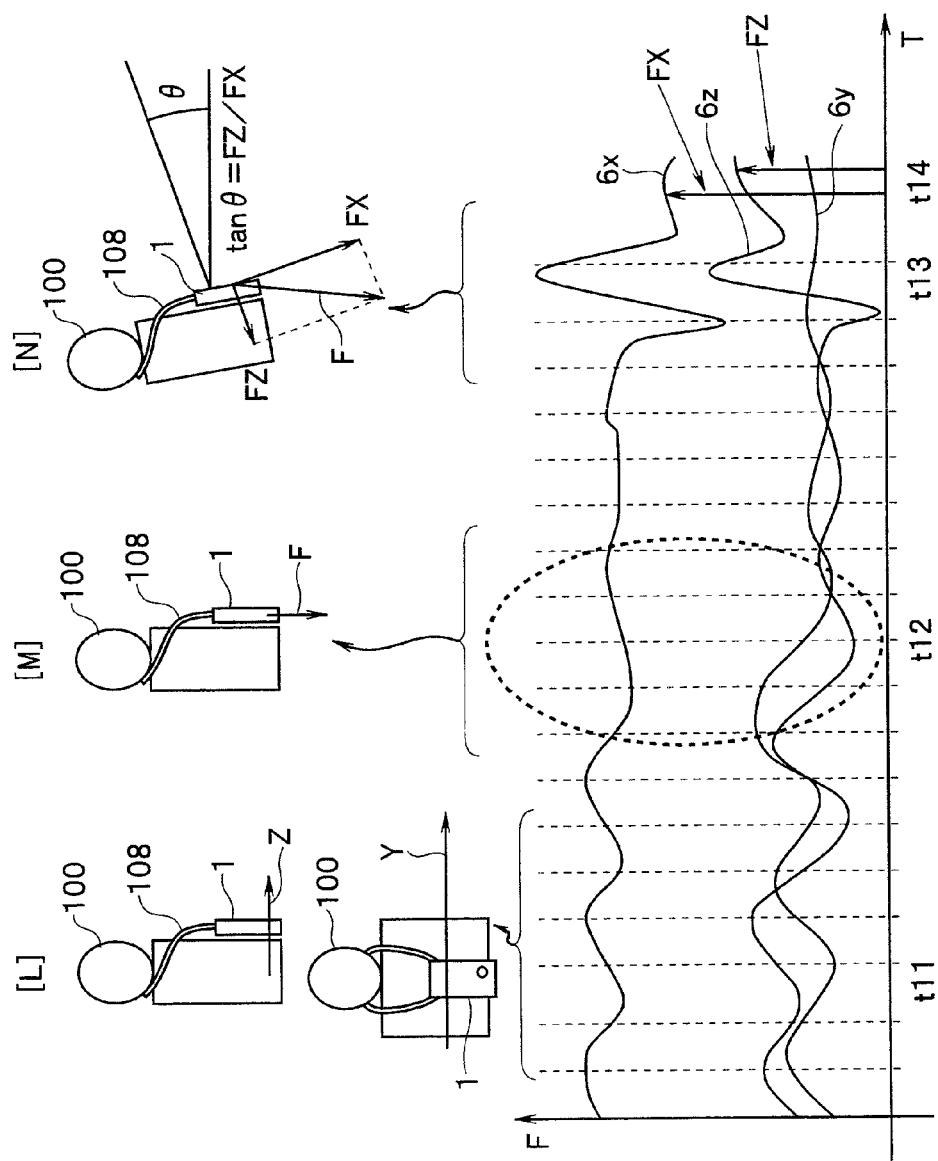
FIG. 31 is a diagram showing the movement of the photographer when carrying an image pickup apparatus in a no-finder state, and output changes of an acceleration sensor, in the image pickup device of the second embodiment of the present invention.

FIG. 31 shows the change in the sensing outputs of the acceleration detection portion 6, when the photographer 100 successively performs each of behaviors of walking (reference character L), standing still (reference character M), bending backward (reference character N). That is, at around time t11, the photographer 100 is walking (behavior indicated by reference character L of FIG. 31), and each sensing output of the acceleration sensor 6x of X axis direction, the acceleration sensor 6y of Y axis direction, and the acceleration sensor 6z of Z axis direction in the image pickup apparatus 1 changes in accordance with walking as shown by the graph in FIG. 31. Particularly, since the image pickup apparatus 1 is hung with the strap 108, the gravitational force acts only in the X direction and therefore the sensing output of the acceleration sensor 6x of X direction is larger than the sensing outputs of other sensors as shown in the figure.

At around time t12, when the photographer 100 comes to a standstill (the behavior indicated by reference character M of FIG. 31) with intention to shoot the object, the change of each sensing output of the acceleration sensors 6x, 6y, and 6z becomes gradual as shown in the dotted line circular portion of the graph of FIG. 31. Then, when the photographer 100 bends himself/herself backward to perform shooting around time t13, the sensing outputs of the acceleration sensors 6x and 6z change significantly according to this motion. That is, since the acceleration sensors 6x and 6z are subjected to acceleration in an inclined direction when the image pickup apparatus 1 is lifted up, a sensor peak as shown in FIG. 31 takes place and there is no significant change in the acceleration sensor 6y.

After sensor peaks of the acceleration sensors 6x and 6z takes place, at around t14, the sensing outputs of these sensors come into a stable state. This is because the photographer 100 bends himself/herself backward and puts the image pickup apparatus 1 into a stationary state in such a way to hold up the image pickup apparatus 1 to be directed toward the object 102. Letting the sensing outputs of the acceleration sensors 6x and 6z at this moment be FX and FZ, the angle θ formed by the optical axis of the image pickup apparatus 1 and the horizon can be determined from the following equation. It is noted that although FX and FZ are shown at displaced positions in FIG. 31, they are measured values at the same time.

$$\tan \theta = FZ/FX$$

Therefore, the angle θ when the photographer 100 bends himself/herself backward can be determined from arc tan (FZ/FX), and this angle θ when it is about half of the angle of view of the shooting lens±10 degree, may be the criterion that shooting (releasing) is OK. That is, after the sensing outputs of the acceleration sensors 6x and 6z become peak values, when the angle θ determined from arctan (FZ/FX) becomes to meet the above described criterion, executing release operation at that timing will make it possible to perform no-finder shooting of the object 102 according to the intention of the photographer 100.

In the present embodiment, although the case in which shooting is performed with the strap 108 being hung from the neck, etc. has been described as an example of no-finder shooting, aside from the method of hanging the strap 108 from the neck, etc., there is also a method of performing shooting with the image pickup apparatus 1 being put into a pocket 110. FIG. 32 is a diagram showing an aspect of no-finder shooting which utilizes an image pickup apparatus equipped with a clip. The image pickup apparatus 1 is provided with a display portion 8 in the back surface, and also provided with a clip 109 as shown in FIG. 32A. This clip 109 allows the image pickup apparatus 1 to be attached into a pocket 110 of the photographer 100 as shown in FIGS. 32B and 32C. If the lens of the image pickup apparatus 1 is exposed to the outside of the pocket 110, release operation can be performed in response to the above described bending backward (the behavior indicated by reference character N of FIG. 31) of the photographer 100, even in a state where both hands are occupied.

Moreover, the angle of attaching the image pickup apparatus 1 to the pocket 110 in FIG. 32B is such that the up and down, and left and right directions of the image pickup apparatus 1 are substantially in conformity with the horizontal and vertical lines of the shooting screen. However, in the example shown in FIG. 32C, those directions are not in conformity with each other. Thus, since the angle of the image pickup apparatus 1 will change according to the preference of the photographer 100 and so on, it is difficult to predict the inclination of the image pickup apparatus screen, as in the case based on the strap 108.

Figure 33A:
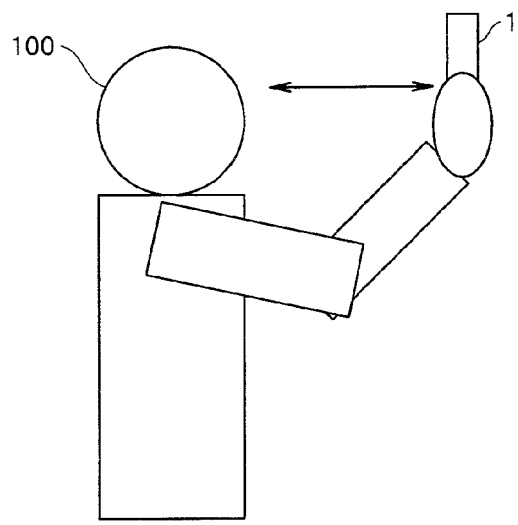
FIG. 33A shows the case of a normal shooting.
Figure 33B:
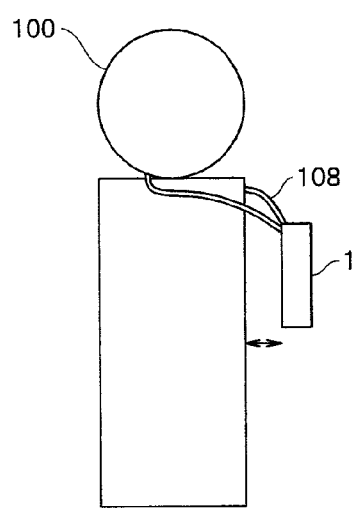
FIG. 33B shows a no-finder state.

FIG. 33B shows the manner in which the photographer 100 performs no-finder shooting with the image pickup apparatus 1 held by hand. When performing normal shooting, the photographer 100 holds the image pickup apparatus 1 at a sufficient distance apart as shown in FIG. 33A, and decides a picture composition while observing the live view display to be displayed on the display portion 8. In a no-finder shooting, as shown in FIG. 33B, shooting is performed without observing the display portion 8 that is disposed on the back surface of the image pickup apparatus 1. In this state, the shooting lens of the image pickup apparatus 1 is directed toward the object, and the back surface side of the image pickup apparatus 1 is adjacent to the photographer 100. Therefore, upon determining whether no-finder shooting or not, one determination condition is whether or not the back surface of the image pickup apparatus 1 is covered with clothes, etc.

Next, effects in the second embodiment of the present invention will be described by using flow charts shown in FIGS. 23 to 26. The processing by these flow charts is primarily executed by a signal processing/control portion 11. Entering into a processing sequence of camera control of FIG. 23, first, no-finder determination processing is performed (S211). Here, determination is made on whether it is no-finder shooting, in which the photographer 100 performs shooting without observing the object image by the live view display in the display portion 8, or not. The determination conditions of no-finder state in the present embodiment are as follows:
(1) the back surface of image pickup apparatus 1 is in a covered state;
(2) the image pickup apparatus 1 is in a posture peculiar to a no-finder state;
(3) the shooting lens of the image pickup apparatus 1 is exposed.
Here, it is determined whether or not these three conditions are fulfilled. Details of the no-finder determination will be described later by using FIG. 24. It is noted that when a no-finder shooting is directly set on a menu screen, the determination processing in step S212 is omitted and the process proceeds to step S214.

When the no-finder determination in step S211 has been performed, next, it is determined whether or not it is currently in a no-finder state based on the determination result (S212). In the below described flow chart of FIG. 24, a determination is made based on if no-finder determination is set, or if other than no-finder is set, in step S244 or step S245.

When the result of determination in step S212 turns out to be "no-finder", next, it is detected if the acceleration condition is fulfilled (S213). Here, it is determined if the acceleration condition is fulfilled in order to determine whether or not it is the timing for the photographer 100 performing release operation by bending himself/herself backward. That is, based on the sensing outputs of the acceleration sensors 6$x$, 6$y$, and 6$z$, it is detected if a waveform of similar tendency to that of the sensor output is drawn from time t13 to time t14 in FIG. 31. The details of the acceleration condition will be specifically described using FIG. 25.

When the acceleration condition is detected in step S213, it is determined whether or not the acceleration condition is OK based on this detection result (S214). When the result of this determination turns out that the acceleration condition is not OK, the process returns to step S211. On the other hand, when the acceleration condition is OK, a shooting operation is performed after step S215 as a result of the photographer 100 performing a release operation by bending himself/herself backward.

First, a circular shooting is performed (S215). Here, image data from the image pickup portion 2 is acquired, and an operation of trimming into a circular shape is performed using the image data in the trimming portion 11$e$ within the signal processing/control portion 11. As described above, in the case of a no-finder shooting, it is difficult to arrange the longitudinal direction (or the direction orthogonal thereto) of the screen of the image pickup apparatus 1 to be aligned with the horizon. FIG. 34A is an example of an image in which the horizon is inclined due to a no-finder shooting. In such a case, although it is general to perform an image processing so that the horizon is conformed as shown in FIG. 34B, the image data is trimmed into a circular shape as shown in FIG. 35A in the present embodiment. This is because in the case of a circular image, there is less unnatural feel even if the horizon is inclined to some extent. It is noted that the inclination of circular image is corrected by using inclination information as shown in FIG. 35B in the present embodiment.

When a circular shooting has been performed, next, a temporary recording is performed (S216). Here, a portion where the image of a circular area 71 (circular image; trimmed image) is removed from the circular image data acquired in step S215 is transformed into a black image (see FIG. 36B; note that black image portion is conveniently shown by a slash hatch pattern in the figure), and the image data is temporarily recorded in a temporary recording portion 4$a$. Moreover, the image data of the circular image is temporarily recorded in a temporary recording portion 4$b$. It is noted that FIG. 36A is an example of shot image by no-finder shooting as in the above described FIG. 34A, showing an example of a shot image in a state in which the horizon is inclined.

When temporary recording has been performed, next, a correction is performed by use of inclination information (S217). In a correction by inclination information, first, a circular image temporarily recorded in the temporary recording portion 4$b$ is subjected to a rotation correction to be transformed into an image without inclination (an inclination-corrected image) as shown in FIG. 36C. Next, the black image temporarily recorded in the temporary recording portion 4$b$ and the circular image after rotation correction are synthesized.

When the result of the determination in step S212 turns out not to be "no-finder", next, it is determined whether or not it is "release" (S221). Since it is not no-finder shooting, a normal release operation by a release button is performed after step S221. In this step, it is determined whether or not the release button of the actuation portion 7 is pressed.

When the result of the determination in step S221 turns out to be "release", next, a normal shooting mode is executed (S222). Where, this shooting mode is a commonly practiced and well known shooting operation and, though will not be described in detail, the image data acquired by the image pickup portion 2 is subjected to image processing. In it noted that although a circular image is generated and thereafter recorded when no-finder shooting is performed, rectangular image data is subjected to an image compression as it is, and thereafter recorded in the recording portion 4 in the case of a normal shooting mode.

When acquisition of image data by a normal shooting mode is performed in step S222, or when correction by inclination information is performed in step S217, image data obtained in each step is subjected to compression processing by an image compression portion 1c and thereafter recorded in the recording portion 4 (S218). When the image data is recorded in the recording portion 4, the process returns to the main sequence.

When the result of the determination in step S221 turns out not to be "release", next, it is determined whether or not it is "reproduction" (S224). Since when the reproduction button of the actuation portion 7 is actuated, a reproduction mode is switched in, the actuation state of the reproduction button is determined in this step. When the result of this determination turns out not to be "reproduction", the process returns to step S211.

On the other hand, when the result of the determination in step S224 turns out to be "reproduction", an image reproduction is performed (S225). In this step, image data recorded in the recording portion 4 is read out and displayed on the display portion 8. When reproduction and displaying is performed, the posture of the image pickup apparatus 1 is sensed, and the inclination of circular image is corrected according to the sensing result. Moreover, when reproducing a single circular image, it is possible to change the inclination of the circular image by rotating it while touching the screen. Further, when a view-by-everyone mode is selected, the inclination of image is corrected such that the vertical line direction of each circular image is radially aligned from the central part of the display portion 8, and thus a layout which is easy to be seen by plural surrounding people is obtained. This image reproduction will be described later in detail using FIG. 26. When the image reproduction has been performed, the process returns to step S224.

In this way, in the processing sequence of the camera control, it is determined whether or not the image pickup apparatus 1 is in a no-finder state (S211, S212), and when it is in a no-finder state, then it is determined whether or not the photographer has made a motion of bending backward (S213, S214); further, when the motion of bending backward is made, a release operation (shooting operation) is performed (S215). As a result of this, the photographer 100 can perform shooting even without grasping the image pickup apparatus 1 by hand and thereby observing the live view display of the display portion 8. Moreover, the motion of bending backward will cause the shooting lens to be directed slightly upward, achieving an effect that the lens is directed toward the face of a person who is opposedly positioned at an appropriate distance apart. In this case, the appropriate distance, which is 2 to 3 meters, is a shooting distance at which if shooting is performed with a normal focal distance, a half-body to full-body image is obtained and a good balance between the landscape in the back and the person can be achieved. In a closer range that this, the background will not appear clearly in the photograph and it becomes difficult to know where the photograph is taken. Further, in a longer range, the face of a person will become too small to recognize its expressions. Further, it may be arranged that the condition of the angle of the image pickup apparatus in the case of shooting by bending backward can be set taking into consideration of the height of the photographer, the view angle of the shooting lens, the length of the strap, and so on.

Next, the no-finder determination in step S211 will be described by using the flow chart shown in FIG. 24. Entering into the flow chart of no-finder determination, first, it is determined whether or not the back light exhibits a whole-surface reflection (S241). Here, the first condition of the above described no-finder determination, that is, whether or not the back surface of the image pickup apparatus 1 is in a covered state is determined. For this purpose, an emitted light 41a is projected from the back light 8d and whether or not reflected light 41b from clothes 45, etc. is present is determined with an optical sensor 8c. From the fact that substantially the entire surface of the display portion 8 is covered with clothes 45, etc. in the case of a no-finder state, determination is made based on whether or not reflected light 41b is received by substantially all the optical sensors 8c.

When the result of the determination in step S241 turns out that the back light whole-surface reflection is present, next, it is determined whether or not a force in the opposite direction to the gravitational force is present along the hanging direction of the strap 108 (S242). Here, the second condition of the above described no-finder determination, that is, whether or not the image pickup apparatus 1 is in a posture peculiar to the no-finder state is determined. For that purpose, it is determined whether or not a force in the opposite direction to the gravitational force is present along the hanging direction of the strap 108 based on the sensing output of the acceleration detection portion 6. It is noted that in the case of the image pickup apparatus with a clip 109 as well, the determination may be made based on the sensing output of the acceleration sensor 6x, etc.

When the result of the determination of step S242 turns out that a force in the opposite direction to the gravitational force is present along the hanging direction of the strap, next, it is determined whether or not image-pickup result image is present (S243). Here, the third condition of the above described no-finder determination, that is, whether or not the shooting lens of the image pickup apparatus 1 is exposed is determined. For that purpose, it is determined whether or not a shot result image is present based on the image data from the image pickup portion 2. This is because when the shooting lens is covered with a bag or a pocket, only black images will be acquired; however, when the shooting lens is exposed, some shot result images must be obtained. In this case, although the shot image may be analyzed, if an average luminance of the image data is not less than a predetermined value, it can be determined that an image-pickup result image is present.

When the result of the determination in step S243 turns out that an image-pickup result image is present, a no-finder determination is set (S244). On the other hand, when it is determined to be No in any of steps S241, S242, or S243, an "other than no-finder" is set (S245). As described above, the determination in step S212 (FIG. 23) is made according to the setting in step S244 or step S245. When the setting in step S244 or S245 has been performed, the process returns to the original processing sequence.

In this way, in the processing sequence of no-finder determination, whether or not it is in a no-finder state is determined. According to the determination result, the image pickup apparatus 1 can be automatically switched into a no-finder shooting mode. It is noted that in the present embodiment, when determining a no-finder state, the determination of no-finder state has been made when the above described three conditions (1) to (3) are satisfied. However, even though three conditions are not satisfied, when two out of three conditions such as (1)+(2), (1)+(3), or (2)+(3) are satisfied, or when a single condition of (1) or (2) is satisfied, the determination of no-finder state may be made. Appropriate combinations may be used depending on the accuracy of each detection means itself, or the desired level of determination accuracy of no-finder state.

Figure 24:
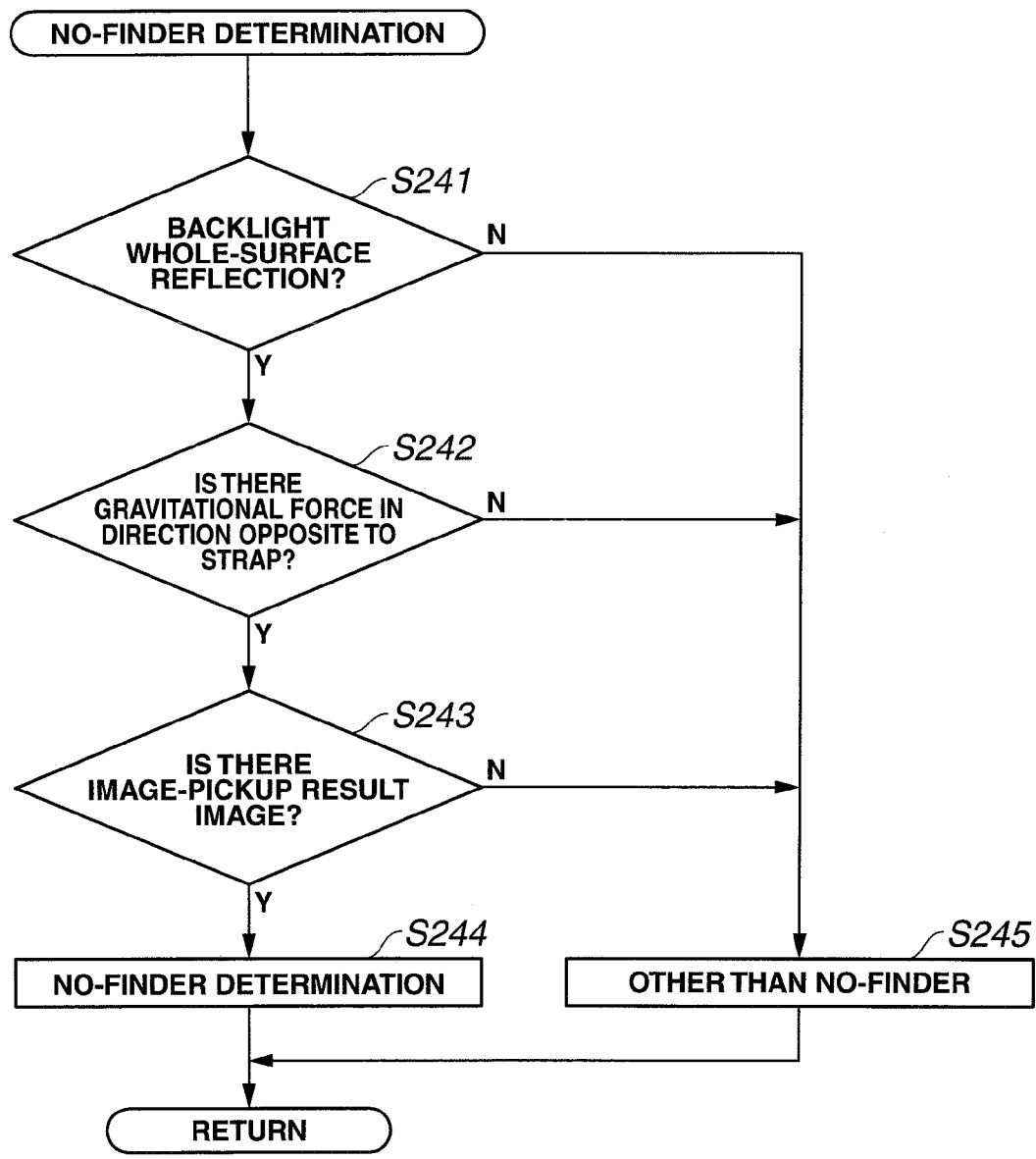
FIG. 24 is a flowchart showing the operation of no-finder determination of the image pickup device of the second embodiment of the present invention.

It is noted that in place of the no-finder determination processing of FIG. 24, a similar processing to the determination processing (step S101 of FIG. 6) of no-finder state in the above described first embodiment may be performed.

Figure 25:
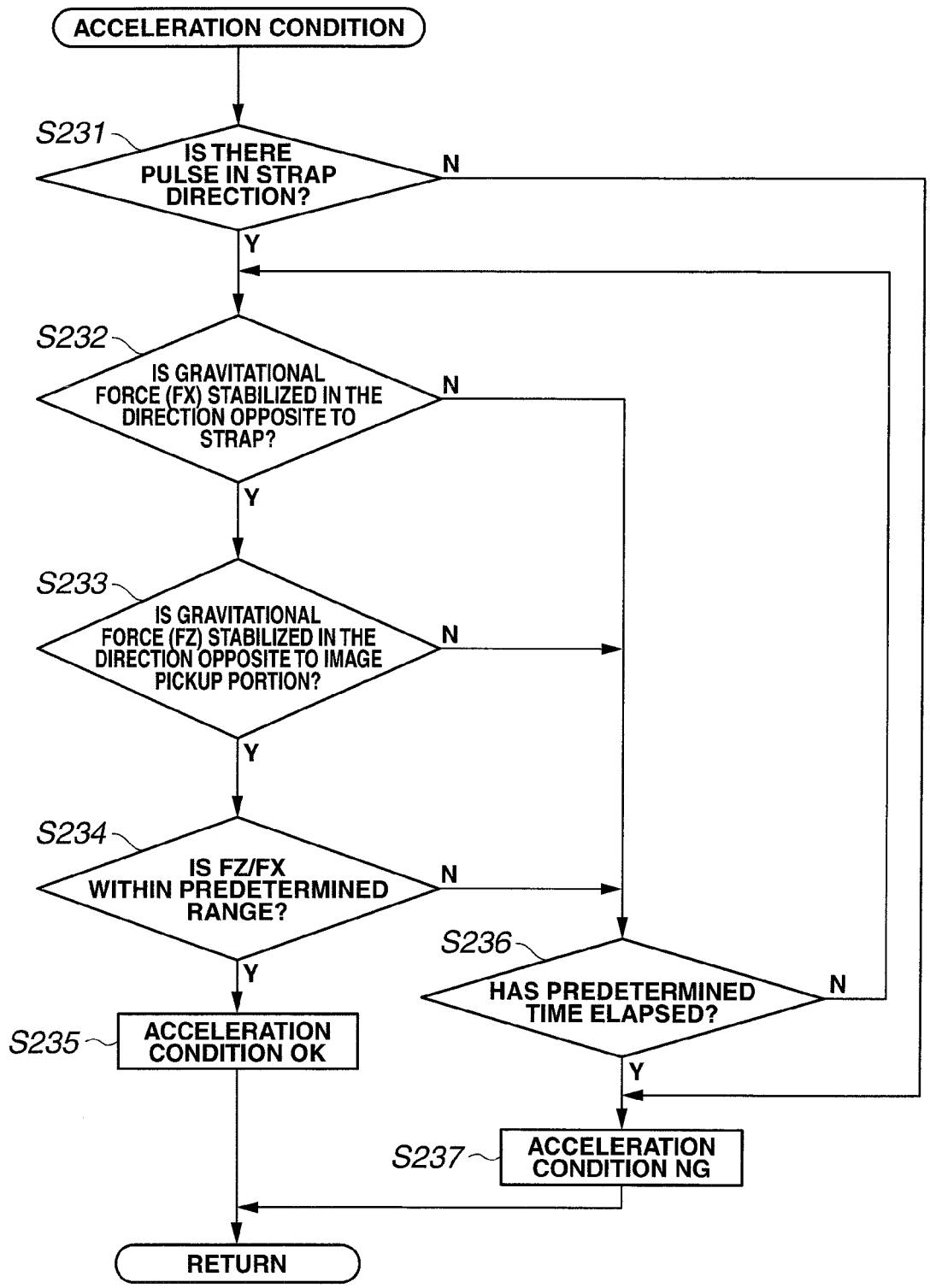
FIG. 25 is a flowchart showing the determination operation of acceleration condition of the image pickup device of the second embodiment of the present invention.

Next, the acceleration condition in step S213 will be described by using the flow chart shown in FIG. 25. Entering into the flow chart of the acceleration condition, first, it is determined whether or not a pulse is present in the strap direction (S231). As described above using FIG. 31, when the photographer 100 performs shooting by bending himself/herself backward, a pulse-like acceleration is generated in the x axis direction and the z axis direction at around time t13, and thereby peak values occurs in the acceleration sensors 6x and 6z. In step S231, it is determined whether or not this pulse-like acceleration is generated.

When the result of the determination in step S231 turns out that a pulse is generated in the strap direction, next, it is determined whether or not a force (FX) in the opposite direction to the gravitational force along the hanging direction of the strap is stabilized (S232). As described above, after a peak is generated in acceleration at around time t13, the sensing outputs of the acceleration sensors 6x and 6z come into a stable state at around time t14. In this step S232, it is determined whether or not the sensing output (FX) of the acceleration sensor 6x is stabilized.

When the result of the determination in step S232 turns out that a force in the opposite direction to the gravitational force along the handing direction of the strap is stabilized, next, it is determined whether or not the gravitational acceleration in the direction along the optical axis of the image pickup portion is stabilized (S233). The optical axis direction of the image pickup portion 2 is the Z axis direction, and here it is determined whether or not the sensing output (FZ) of the acceleration sensor 6z is stabilized.

When the result of the determination in step S233 turns out that the gravitational acceleration in the direction along the optical axis of the image pickup portion is stabilized, next, it is determined whether or not FZ/FX is within a predetermined range (S234). As described above, since it is satisfactory if the angle θ, that is, arc tan (FZ/FX) is about half of the view angle of the shooting lens±10 degrees, it is determined whether or not FZ/FX is within the range that is thus determined.

When the result of the determination in step S234 turns out that FZ/FX is within a predetermined range, "acceleration condition OK" is set (S235). On the other hand, when any of the results of the determination in steps S232 to S234 turns out to be No, next, it is determined whether or not a predetermined time has elapsed (S236)" Here, it is determined whether or not the image pickup apparatus 1 is stabilized directing toward the object 102 when the photographer 100 bends himself/herself backward with the intention of shooting. Upon performing this determination, the time that has elapsed since a pulse is generated in the strap direction in step S231 is measured by a clock portion 9. When the result of this determination turns out that the predetermined time has not elapsed, the process returns to step S232.

On the other hand, when the result of the determination in step S236 turns out that the predetermined time has elapsed, or when the result of the determination in step 231 turns out that a pulse has not been generated in the strap direction, "acceleration NG" is set (S237). When OK or NG is set in step S235 or step S237, the process returns to the original processing sequence.

In this way, in the flow chart of the acceleration condition, when with a trigger that a pulse that is lifted up in the strap direction is generated (S231), and thereafter a stable gravitational force is detected, the "acceleration OK" is set. It is noted that a stabilized state can be determined from the fact that the result of the determination turns out to be not more than a predetermined variation for plural times.

Figure 26:
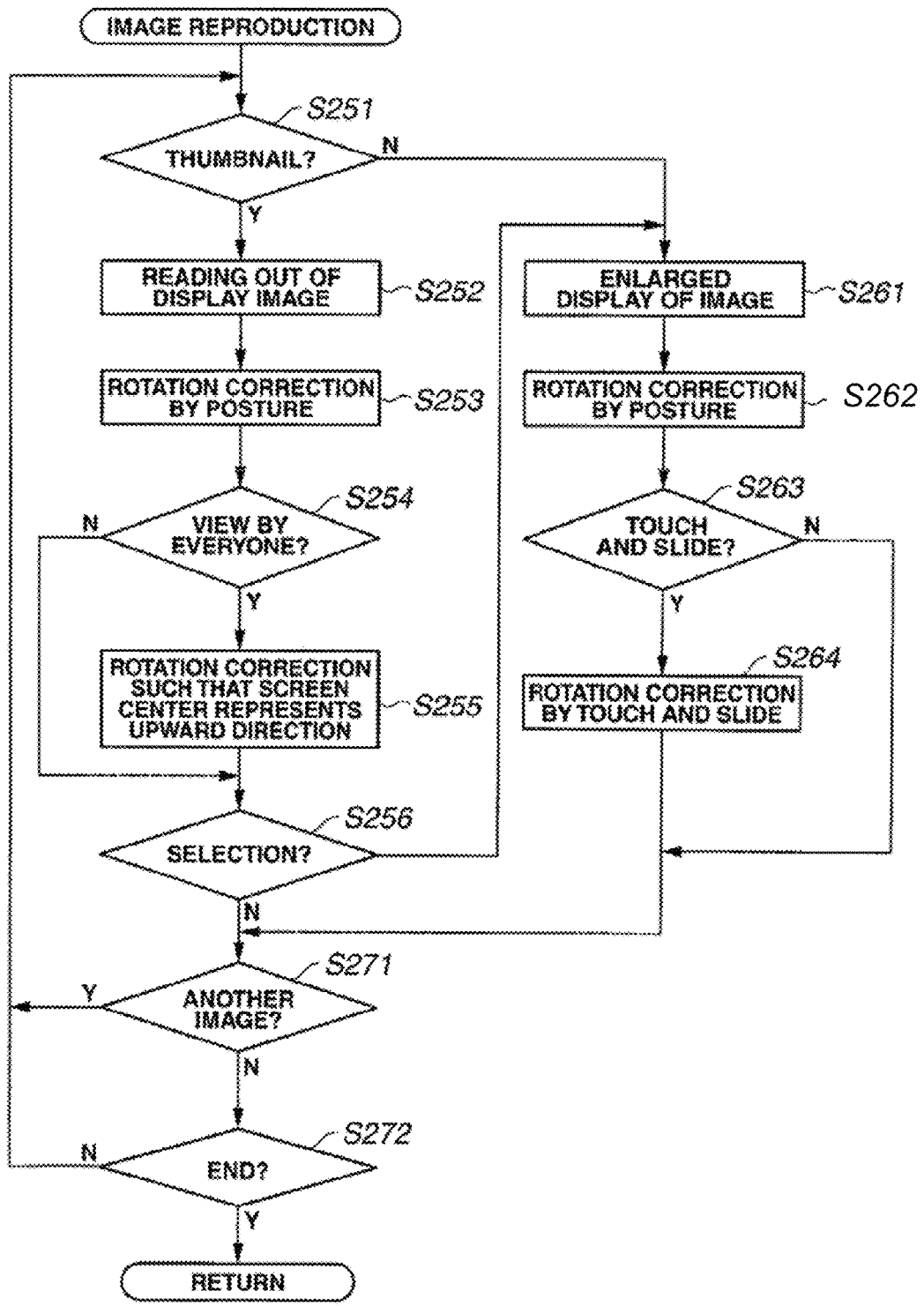
FIG. 26 is a flowchart showing the operation of image reproduction of the image pickup apparatus of the second embodiment of the present invention.

Next, the image reproduction in step S225 will be described by using the flow chart shown in FIG. 26. Entering into the processing sequence of image production, first, it is determined whether or not it is a thumbnail display (S251). Thumbnail display is a mode in which image recorded in the recording portion 4 is reduced and a plurality of images are simultaneously displayed on the display portion 8. In the present embodiment, this thumbnail display is set as a default value. The thumbnail display and a single display can be switched to each other by actuating a zoom lever.

When the result of the determination in step S251 turns out not to be a thumbnail display, an enlarged display of image is performed (S261). Here, image data stored in the recording portion 4 is read out, and an enlarged display is performed on the display portion 8 based on the read out image data.

When the enlarged display of the image has been performed, next, a rotation correction by posture is performed (S262). Here, first, a current posture of the image pickup apparatus 1, for example, whether it is in a longitudinal position or in a lateral position, is detected by the acceleration detection portion 6. Then, a rotation correction of a circular image is performed by an image manipulation processing portion 11d based on the detected posture of the image pickup apparatus.

When rotation correction by posture has been performed, next, it is determined whether or not a touch and slide is performed (S263). When the photographer wants to manually rotate the circular image "a" (see FIG. 37A) displayed on the display screen of the display portion 8, the photographer slides a finger in P direction along the rotational direction (see FIG. 37B). Accordingly, in this step, the motion of the finger on the touch panel 8b is detected.

When the result of the determination in step S263 turns out that a touch and slide has been made, rotation correction is performed according to the slide direction (S264). Here, the image manipulation processing portion 11d performs rotation correction on the circular image "a" according to the slide direction, as shown in FIG. 37C.

When the result of the determination in step S25I turns out to be the thumbnail display, next, display image is read out (S252). Here, a plurality of image data for thumbnail display that are recorded in the recording portion 4 are read out. Next, as in step S262, rotation correction by posture is performed (S253). Here, the rotation correction of circular image is performed by the image manipulation processing portion 11d based on the detected current posture of the image pickup apparatus. This rotation correction makes images easy to be seen according to the posture of the image pickup apparatus 1.

Figure 38A:
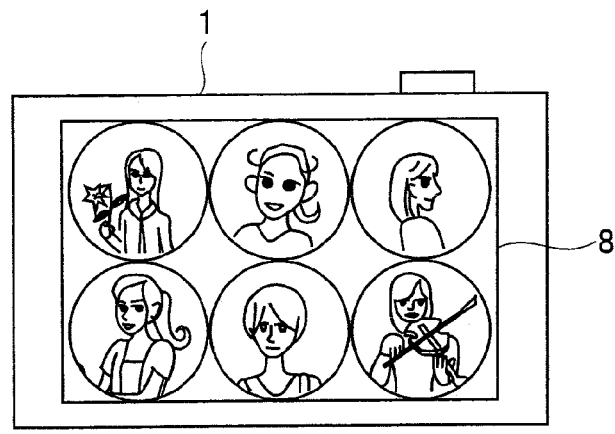
FIG. 38 is a diagram showing an example of reproduced image when thumbnails are displayed during reproduction in the image pickup device of the second embodiment of the present invention.
Figure 38B:
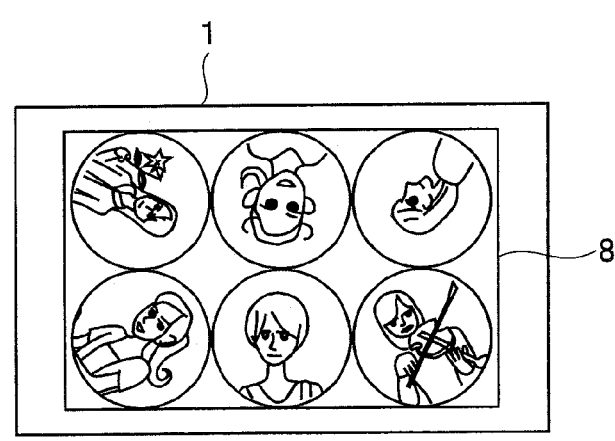
Figure 38C:
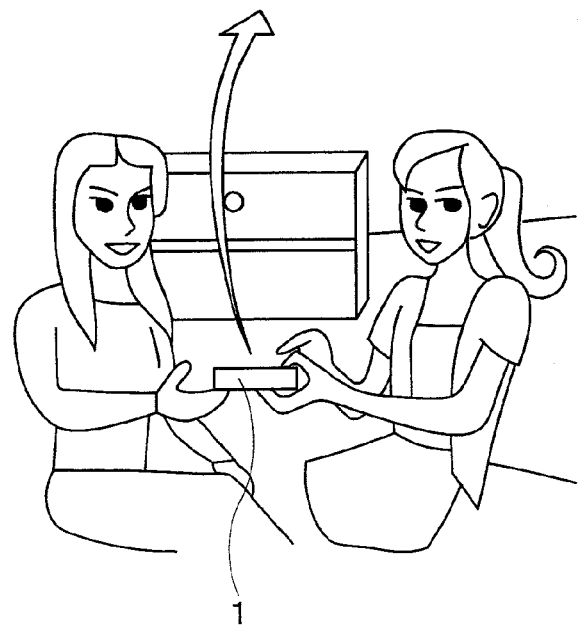

When rotation correction by posture has been performed, next, it is determined whether or not "view-by-everyone" (S254). "View-by-everyone" is a mode for allowing plural people to see a thumbnail display that is reproduced on the display portion 8 of the image pickup apparatus 1 as shown in FIG. 38C. That is a display method in which when plural people surrounding the image pickup apparatus 1 is viewing a thumbnail display as shown in FIG. 38C, to make the thumbnail display easily viewable from each person, the thumbnail display of the form shown in FIG. 38A is transformed into the thumbnail display of the form as shown in FIG. 38B (directions of circular images are changed so as to be radially aligned). Since this view-by-everyone mode can be set by actuating a view-by-everyone button (actuation member) of the actuation portion 7, in this step, it is determined whether or not this button is actuated.

When the result of the determination in step S254 turns out that view-by-everyone is selected, next, rotation correction is performed such that the screen center represents the upward direction (S255). Here, rotation correction is performed by the image manipulation processing portion 11*d* such that the vertical line direction of each circular image is radially aligned from the center of the display screen. It is noted that since this rotation correction is for the purpose of making the image pickup apparatus 1 easy to see for every viewer, an exact radial form is not necessary.

When rotation correction has been performed such that the screen center represents the upward direction in step S255, or when the result of the determination in step S254 turns out that view-by-everyone is not selected, next, it is determined whether or not image selection has been performed (S256). Since when the photographer wants to see an image as a single image from among the images in thumbnail display, the photographer selects the image by touch etc., here, it is determined whether or not the image is selected by touch, etc. When the result of this determination turns out that an image is selected, the process proceeds to the above described step S261, and performs an enlarged display of the selected image.

When the result of the determination in step S256 turns out that image selection has not been performed, or when rotation correction is performed by touch and slide in step S264, or when the result of the determination in step S263 turns out that a touch and slide has not been performed, next, it is determined whether or not an instruction of another image is performed (S271). Since in a thumbnail display, the page feed/return of thumbnail screen is performed by a cross key etc. of the actuation portion 7, and in the case of single image display, the image feed/return is performed by a cross key, etc., here, it is determined whether or not an instruction of another image is made by a cross key, etc. When an instruction of another image has been made, the process returns to step S251.

On the other hand, when the result of the determination in step S271 turns out that instruction of another image has not been made, it is determined whether or not reproduction is ended. Here, it is determined whether or not the reproduction button is actuated again. When the result of this determination turns out not to be an End, the process returns to step S251. On the other hand, when turns out to be an End, reproduction ending processing is performed, and thereafter the process returns to the original processing sequence.

In this way, in the reproduction in the present embodiment, when a single image is reproduced, rotation correction of circular image is performed according to the posture of image pickup apparatus. As a result of this, images become easy to see according to the posture of the image pickup apparatus. Moreover, in the reproduction and display of a single image, it is made possible to change the direction of circular image by touch and slide. This allows an image to be displayed in a direction in accordance with the intention of the photographer.

Further, in the present embodiment, rotation correction of circular image is performed according the posture of image pickup apparatus. As a result of this, an image becomes easy to see according to the posture of the image pickup apparatus. Moreover, when an instruction of view-by-everyone is made, rotation correction in a radial form is performed. This makes it possible to view from various directions at the same time surrounding the image pickup apparatus 1, thereby proposing a new viewing method. It is noted that although in the present embodiment, the direction of circular image is changed by touch and slide, aside from that, for example, it may of course be arranged to change the direction with a dial, etc.

Third Embodiment

Figure 39:
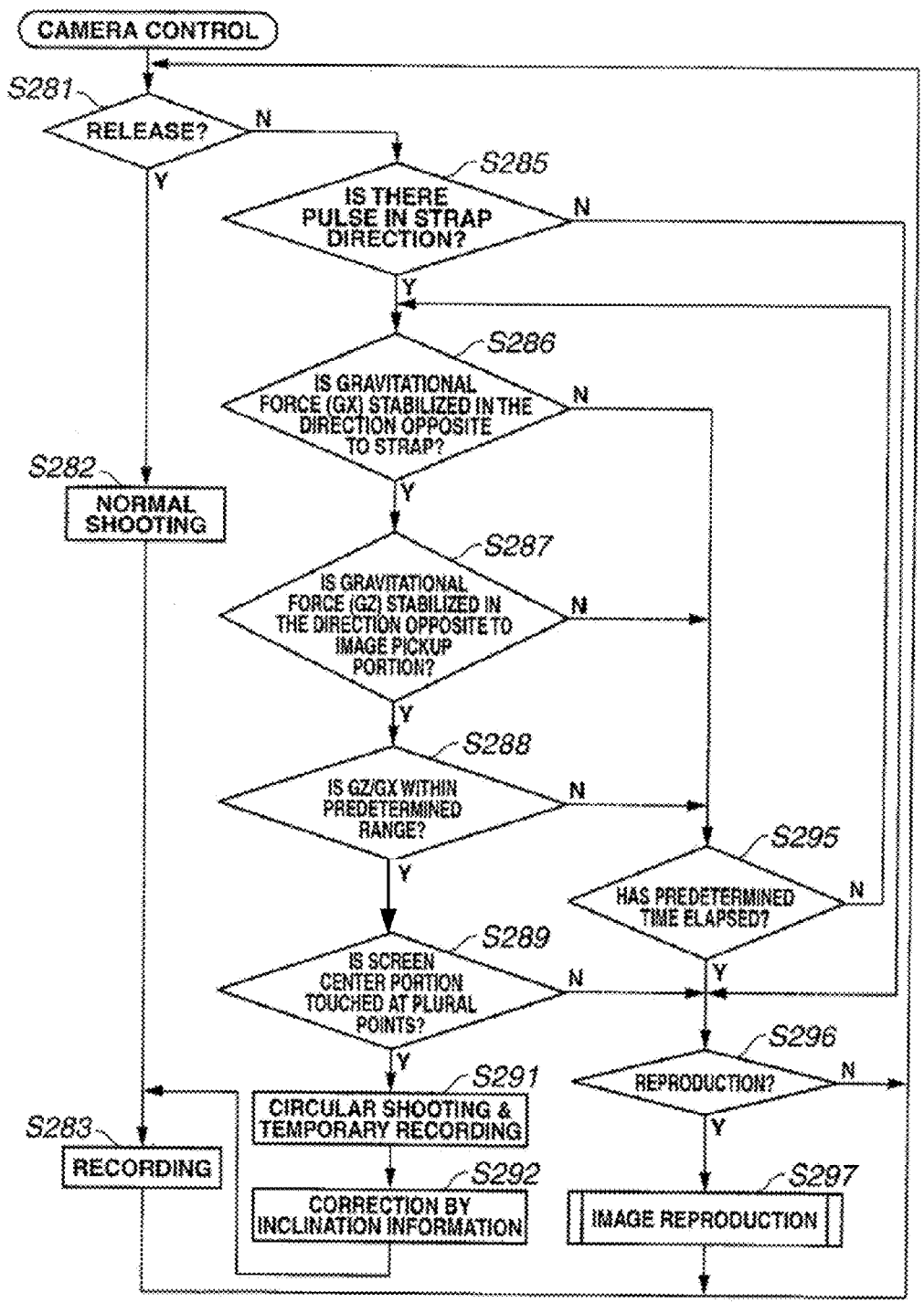
FIG. 39 is a flowchart showing the operation of camera control of an image pickup apparatus relating to a third embodiment of the present invention.
Figure 40:
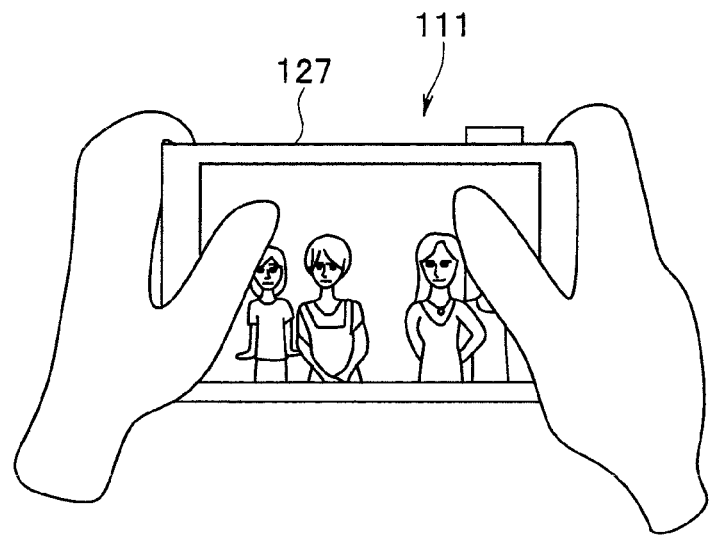
FIG. 40 is a diagram showing a normal shooting operation in a use situation of a conventional image pickup apparatus.
Figure 41:
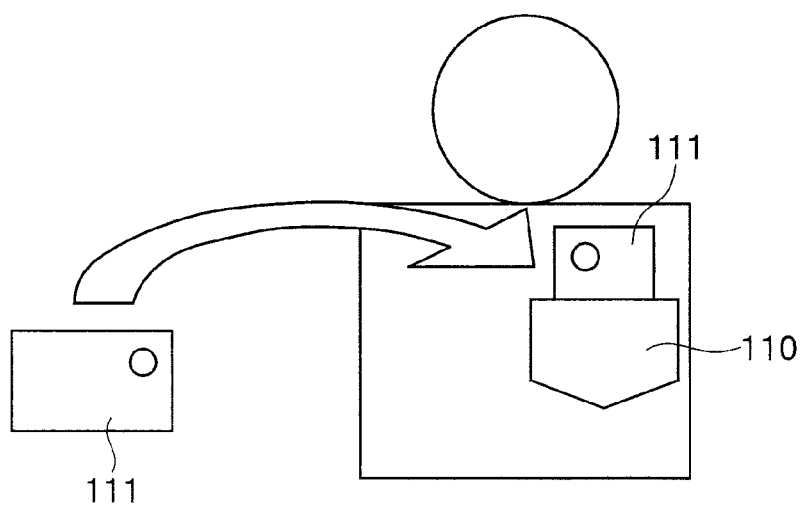
FIG. 41 is a diagram to illustrate a state in which the image pickup apparatus is contained in a pocket in a use situation of a conventional image pickup apparatus.

Next, a third embodiment of the present invention will be described by using FIG. 39. In this third embodiment, it is constantly detected if in a no-finder state, and when in a no-finder state, then it is constantly detected if the photographer has performed a motion of bending backward, with the acceleration detection portion 6. In the third embodiment, it is arranged that a pulse is generated when a force is applied in the strap direction, and when this pulse is detected, in addition to the determination on whether or not it is no-finder shooting, a no-finder shooting is executed. Thus, the detection of whether or not it is in a no-finder state is suppressed to a minimum level.

The configuration of the present embodiment is such that a comparator which is operable even at very low power (about 10 mW) is provided in the acceleration detection portion 6 in the block diagram shown in FIG. 1, and this comparator outputs a sensing signal when the acceleration sensors 6*x* and 6*z* detect vibration of not less than a predetermined value in the strap direction. Since the configuration other the above is substantially the same as the configuration shown in FIG. 1, detailed description thereof will be omitted.

Next, the operation of the present embodiment will be described by using the flowchart shown in FIG. 39. Entering into the processing sequence of camera control, first, as in step S221, it is determined whether or not releasing is performed (S281). In this step, it is determined whether or not a release button of the actuation portion 7 is actuated. When the result of this determination turns out to be a release, a normal shooting is performed (S282), and image data acquired here is recorded in the recording portion 4 (S283). Here, since the normal shooting is a well-known shooting operation, though not to be described in detail, image data outputted from the image pickup portion 2 is subjected to image processing and compression processing, and thereafter is recorded in the recording portion 4. Though, when performing a no-finder shooting, an image is processed into a circular image, image data of rectangular shape is recorded as it is in the case of a normal shooting as with the above described first and second embodiments. When image data has been recorded, the process returns to step S281.

When the result of the determination in step S281 turns out not to be a release, next, it is determined whether or not there is a pulse in the strap direction (S285). As described above, since the acceleration detection portion 6 in the present embodiment generates a pulse, when the photographer 100 bends himself/herself backward and a force is applied in the strap direction, in this step, it is determined whether or not the pulse has been generated.

When the result of the determination in step S285 turns out that a pulse has been generated, next, as in step S232, it is determined whether or not a force (GX) in the opposite direction to the gravitational force in the hanging direction with the strap 108 is stabilized (S286). Here, it is determined whether or not the sensing output (GX) of the acceleration sensor 6x is stabilized. When the result of this determination turns out that the gravitational force (GX) is stabilized, next, as in step S233, it is determined whether or not a gravitational acceleration (GZ) in the direction along the optical axis of the image pickup portion 2 is stabilized (S287). Here, it is determined whether or not the sensing output (GZ) of the acceleration sensor 6z is stabilized.

When the result of the determination in step S287 turns out that the gravitational force (GZ) is stabilized, next, as in step S234, it is determined whether or not GZ/GX is within a predetermined range (S288). When the results of this determination, or the determination in step 286 and step S287 turn out to be No, next, as in step S236, it is determined whether or not a predetermined time has elapsed (S295). When the result of this determination turns out that the predetermined time has not elapsed, the process returns to step S286.

When the result of the determination in step S289 turns out that GZ/GX is within a predetermined range, including the determinations of steps S285, S286, and S287, it can be determined that the photographer 100 has performed a motion of bending backward. Accordingly, next, it is determined whether or not a screen center portion is touched at plural points (S289). Here, the determination is made based on the sensing outputs from plural optical sensors 8c at points in the screen center portion of the touch panel 8b. This determination is made for the purpose of detecting if the display portion 8 is covered with clothes, etc. and in a no-finder state.

When the result of the determination in step S289 turns out that the screen center portion has been touched at plural points, since the photographer 100 has performed a motion of bending backward in a no-finder state, a release operation is started at this timing. First, as in steps S215 and S216, a circular shooting and temporary recording are performed (S291). Here, image data is acquired from the image pickup portion 2, and this image data is subjected to image processing so as to be a circular shape (see FIG. 36B) and is temporarily recorded in the temporary recording portions 4a and 4b.

When the circular shooting and temporary recording have been performed, next, as in step S217, a correction is performed by inclination information (S292). Here, the image data of circular images temporarily recorded in the temporary recording portions 4a and 4b are subjected to an inclination correction based on the inclination information from the acceleration detection portion 6 to obtain an image as shown in FIG. 36C. When the correction by inclination information has been performed, the process proceeds to the above described step S283, and records the image data in the recording portion 4 (S283).

When the result of the determination in step S295 turns out that a predetermined time has elapsed, or the result of the determination in step S289 turns out that the screen center portion has not been touched at plural points, or when the result of the determination in step S285 turns out that a pulse has not been generated in the strap direction, next, as in step S224, it is determined whether or not it is in a reproduction mode (S296). When the result of this determination turns out not to be in a reproduction mode, the process returns to step S281.

When the result of the determination in step S296 turns out to be in a reproduction mode, next, as in step S225, an image reproduction is performed (S297). Here, the above described flow chart shown in FIG. 26 is executed. When the image reproduction has been performed, the process returns to step S281.

As so far described, in the third embodiment of the present invention, since in a normal state, it is only determined whether or not there is a pulse in the strap direction (S285), it is not necessary to frequently perform the determination on whether or not it is in a no-finder state. This makes it possible to suppress the power consumption to a minimum level, and to perform a shooting hands-free as desired.

It is noted that in the present embodiment, although description has been made on a case in which the strap 108 is provided, even for an image pickup apparatus with a clip 109, etc., it can be arranged, as with the present embodiment, that when the photographer performs a motion of bending backward in a no-finder state, releasing is performed. In this case, it may be arranged that a gravitational direction in a state of being hung from a pocket 110, etc. with the clip 109 is sensed to determine that the strap direction be the direction opposite to the gravitational direction.

Moreover, in the present embodiment, an acceleration in a first direction (the strap direction (the direction opposite to the gravitational direction in a normal state) in the embodiment) is sensed, and also an acceleration in a second direction (the direction in which the gravitational acceleration in the optical axis direction of the image pickup portion 2 is applied to the back surface of the image pickup apparatus in the embodiment) which is different from the first direction is sensed so that the timing of performing a release operation is determined based on these accelerations. This allows the photographer to perform a release operation by performing a motion of bending backward, etc. even in a state that the photographer cannot press a release button with both hands being occupied.

It is noted that although acceleration is sensed by the acceleration detection portion 6 in the present embodiment, such a detection portion may be any type provided that it can detect the motion applied to the image pickup apparatus 1, and of course may be an angular acceleration sensor, a gyroscope, and other detection portions. Moreover, although when a no-finder shooting is performed, the image is recorded after being processed into a circular image in the present embodiment, it may of course also be arranged that a rectangular image is recorded as it is.

Further, it may be arranged to concurrently implement these examples, such as to concurrently record along with an image trimmed from an image obtained by synthesizing the result of a continuous shooting, an image before the synthesis, and a circular trimmed image. It may be arranged that images while the shooting range is changing are synthesized and shot, and images after the change is stopped are shot without being synthesized. This makes it possible to avoid missing shooting chances by the synthesis of a wide shooting range, obtain images without blur by a shooting in a stable condition, and select images according to one's liking.

Thus, according to the above described each embodiment of the present invention, it is possible to provide an image pickup apparatus which enables a release operation, for example, even in a state in which one cannot perform a behavior to press a release button by hand.

The present invention will not be limited to the above described embodiments, and it is of course possible to implement various modifications and applications within the range not departing from the spirit of the invention. Further, the above described embodiments include inventions of various stages, and various inventions can be drawn by appropriate combinations of plural claimed elements to be disclosed. For example, when even if some claimed elements are removed from all the claimed elements stated in the above described each embodiment, the problem to be solved by the invention still can be solved, and effects of the invention can be achieved, the configuration from which the foregoing claimed elements are excluded can be extracted as an invention. The present invention will not be restricted by any specific embodiment except as limited by the appended claims.

The present invention can be widely applied, without being limited to the form of image pickup apparatuses of a normal form, which are electronic equipment dedicated to shooting function, such as digital cameras, to other forms of electronic equipment equipped with shooting functions, for example, various types of electronic equipment with shooting function, such as recording equipment, portable phones, electronic notebooks, personal computers, game machines, digital media players, televisions, clocks, navigation equipment utilizing GPS (Global Positioning System), and others.

What is claimed is:

1. An image pickup apparatus, comprising:
    an image pickup portion;
    a recording portion that records an image signal based on an output signal from the image pickup portion;
    a determination portion that determines whether or not the image pickup apparatus is in a no-finder state in which a photographer performs shooting without confirming a display screen, based on an optical sensor output, an acceleration sensor output, and the image signal;
    a posture detection portion that detects a posture change of the image pickup apparatus responsive to a determination that the image pickup apparatus is in the no-finder state; and
    a control portion that (1) causes the image pickup portion to start a continuous shooting operation and acquires a series of plural image signals responsive to detecting the posture change of the image pickup apparatus based on an output signal of the posture detection portion, and (2) performs panorama synthesis processing for generating a panorama image by selectively joining images represented by the series of plural image signals based on the series of plural image signals acquired with the continuous shooting operation.

2. The image pickup apparatus according to claim 1, wherein
    the posture detection portion is an acceleration detection portion that includes an acceleration sensor for detecting an acceleration applied to the image pickup apparatus.

3. The image pickup apparatus according to claim 2, wherein
    the control portion detects an acceleration of posture change of the image pickup apparatus based on an output signal of the acceleration detection portion, and controls a shooting speed of continuous shooting operation according to the detected acceleration.

4. The image pickup apparatus according to claim 1, wherein the control portion includes a trimming portion that performs trimming processing for cutting out a partial area of the panorama image so that an image of a primary object is located substantially at a center of the screen.

5. The image pickup apparatus according to claim 1, further comprising:
    a microphone that converts voice into an electric signal, wherein
    the control portion takes into consideration an output signal of the microphone when controlling an execution of the shooting operation.

6. The image pickup apparatus according to claim 1, further comprising:
    two shooting modes, which are a no-finder shooting mode and a normal shooting mode, wherein
    the no-finder shooting mode is set responsive to a determination that the image pickup apparatus is in the no-finder state by determination portion and a shooting based on the posture change or the moving situation is executed during the no-finder shooting mode.

7. The image pickup apparatus according to claim 4, further comprising:
    a face detection portion, wherein
    the trimming portion sets a trimming area in the trimming processing, based on a detection result by the face detection portion.

8. An image acquisition method, comprising:
    an image pickup step of picking up an image;
    a recording step of recording an image signal based on an output signal in the image pickup step;
    a determination step of determining whether or not an image pickup apparatus is in a no-finder state in which a photographer performs shooting without confirming a display screen, based on an optical sensor output, an acceleration sensor output, and the image signal;
    a posture detection step of detecting a posture change of the image pickup apparatus responsive to a determination that the image pickup apparatus is in the no-finder state; and
    a control step of causing an image pickup portion to start a continuous shooting operation and acquiring a series of plural image signals responsive to detecting the posture change of the image pickup apparatus based on an output signal in the posture detection step, and performing panorama synthesis processing for generating a panorama image by selectively joining images represented by the series of plural image signals based on the series of plural image signals acquired with the continuous shooting operation.

9. A non-transitory recording medium recording a program for causing a computer of an image pickup apparatus to execute image pickup processing comprising:
    an image pickup step of picking up an image;
    a recording step of recording an image signal based on an output signal in the image pickup step;
    a determination step of determining whether or not an image pickup apparatus is in a no-finder state in which a photographer performs shooting without confirming a display screen, based on an optical sensor output, an acceleration sensor output, and the image signal;
    a posture detection step of detecting a posture change of the image pickup apparatus responsive to a determination that the image pickup apparatus is in the no-finder state; and
    a control step of causing an image pickup portion to start a continuous shooting operation and acquiring a series of plural image signals responsive to detecting the posture change of the image pickup apparatus based on an output signal in the posture detection step, and performing panorama synthesis processing for generating a panorama image by selectively joining images represented by the series of plural image signals based on the series of plural image signals acquired with the continuous shooting operation.

* * * * *

UNITED STATES PATENT AND TRADEMARK OFFICE
CERTIFICATE OF CORRECTION

PATENT NO. : 9,113,064 B2  
APPLICATION NO. : 13/023327  
DATED : August 18, 2015  
INVENTOR(S) : Kimiharu Asami et al.

Page 1 of 1

It is certified that error appears in the above-identified patent and that said Letters Patent is hereby corrected as shown below:

On the title page of the patent, item (30) Foreign Application Priority Data, should be corrected as shown below:

"Nov. 5, 2009   (JP).....................................2009-253800" should be deleted; and  
"Dec. 17, 2009  (JP).....................................2009-286658" should be deleted.

Signed and Sealed this  
Sixteenth Day of August, 2016

Michelle K. Lee  
*Director of the United States Patent and Trademark Office*